United States Patent
Yang et al.

(10) Patent No.: US 12,369,086 B2
(45) Date of Patent: Jul. 22, 2025

(54) COMMUNICATION METHOD, APPARATUS, AND SYSTEM

(71) Applicant: Huawei Technologies Co., Ltd., Guangdong (CN)

(72) Inventors: Zhaoqing Yang, Shanghai (CN); Haoxiang Zhu, Shanghai (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 243 days.

(21) Appl. No.: 18/170,731

(22) Filed: Feb. 17, 2023

(65) Prior Publication Data
US 2023/0209422 A1    Jun. 29, 2023

Related U.S. Application Data

(63) Continuation of application No. PCT/CN2020/110343, filed on Aug. 20, 2020.

(51) Int. Cl.
*H04W 36/06* (2009.01)
*H04W 28/22* (2009.01)
*H04W 36/26* (2009.01)
*H04W 72/0457* (2023.01)

(52) U.S. Cl.
CPC ........... *H04W 36/06* (2013.01); *H04W 28/22* (2013.01); *H04W 36/26* (2013.01); *H04W 72/0457* (2023.01)

(58) Field of Classification Search
CPC ..... H04W 36/06; H04W 28/22; H04W 36/26; H04W 72/0457; H04W 36/0044; H04W 36/0064; H04W 36/08
See application file for complete search history.

(56) References Cited

U.S. PATENT DOCUMENTS

| 2008/0273503 A1 | 11/2008 | Lee et al. |
| 2016/0095018 A1* | 3/2016 | Vajapeyam ....... H04W 28/0278 370/331 |
| 2019/0182716 A1 | 6/2019 | Futaki et al. |

FOREIGN PATENT DOCUMENTS

| CN | 107820236 A | 3/2018 |
| CN | 109803312 A | 5/2019 |
| CN | 110475297 A | 11/2019 |

(Continued)

*Primary Examiner* — Khoa Huynh
(74) *Attorney, Agent, or Firm* — WOMBLE BOND DICKINSON (US) LLP

(57) ABSTRACT

A method includes a first access network device that sends first indication information to a second access network device. The first indication information indicates information about a current active BWP and/or transmission rate information of a terminal device on the first access network device. The second access network device determines information about a first-time active BWP and/or BWP configuration information of the terminal device on the second access network device based on the first indication information. The method may be used to enable the second access network device to determine the appropriate information about the first-time active BWP and/or the appropriate BWP configuration information of the terminal device on the second access network device. In this way, service interruption caused by switching of an active BWP is reduced, and/or service interruption caused by changing of a BWP configuration is reduced.

17 Claims, 7 Drawing Sheets

(56) References Cited

FOREIGN PATENT DOCUMENTS

| | | | | |
|---|---|---|---|---|
| EP | 3432638 | A1 | 1/2019 | |
| EP | 3697162 | A1 | 8/2020 | |
| WO | 2018141355 | A1 | 8/2018 | |
| WO | WO-2019062663 | A1 * | 4/2019 | ............ H04W 36/08 |

* cited by examiner

COMMUNICATION METHOD, APPARATUS, AND SYSTEM

CROSS-REFERENCE TO RELATED APPLICATIONS

This application is a continuation of International Application No. PCT/CN2020/110343, filed on Aug. 20, 2020, the disclosure of which is hereby incorporated by reference in its entirety.

TECHNICAL FIELD

This application relates to the field of mobile communication technologies, and in particular, to a communication method, apparatus, and system.

BACKGROUND

In a long term evolution (LTE) mobile communication system, after a terminal device obtains a carrier bandwidth of a serving cell in which the terminal device is located by decoding a master information block (MIB), an operating bandwidth of the terminal device needs to be consistent with the carrier bandwidth of the serving cell and remains unchanged. The fifth-generation (5G) mobile communication technology new radio (NR) is a very important basis for next-generation cellular mobile technologies. The 5G technology aims to support a variety of target services, and may be oriented to an enhanced mobile broadband (eMBB) service, an ultra-reliable low-latency communication (URLLC) service, and a massive machine-type communication (mMTC) service. A minimum cell bandwidth of NR may be 5 MHz and a maximum cell bandwidth of NR is up to 400 MHZ. If all terminal devices are required to support the maximum cell bandwidth of 400 MHZ, there is no doubt that a high requirement is imposed on performance of the terminal devices, which is not conducive to reducing costs of the terminal devices. Particularly, for an mMTC terminal, this is clearly improper. In addition, one terminal device cannot occupy the entire bandwidth of 400 MHz. If the terminal device uses a sampling rate corresponding to the bandwidth of 400 MHz, performance is undoubtedly wasted. In addition, a large bandwidth means a high sampling rate, and the high sampling rate means high power consumption. Under such a background, the foregoing problem is resolved by using a bandwidth part (BWP) (which may alternatively be referred to as a bandwidth part) technology of an NR system. It is different from a fixed bandwidth in an LTE system that, in the NR system, an access network device may configure a BWP for a terminal device. The BWP is a segment of consecutive frequency domain resources configured by the access network device for the terminal device, so that flexible transmission bandwidth configuration between the access network device and the terminal device can be implemented. By using the BWP, the terminal device may not need to know an actual transmission bandwidth (for example, a carrier bandwidth) of the access network device, but only needs to support a BWP bandwidth configured for the terminal device. The terminal device operates on a bandwidth of the BWP, and the BWP is a subset of an entire carrier bandwidth.

However, a BWP configuration parameter configured by the access network device for the terminal device may be inappropriate.

SUMMARY

Embodiments of this application provide a communication method, apparatus, and system. According to the technical solutions provided in this application, a second access network device may configure appropriate first configuration information for a terminal device based on first indication information from a first access network device. In this way, service interruption caused by switching of an active BWP is reduced, and/or service interruption caused by changing of a BWP configuration and changing of the active BWP is reduced.

According to a first aspect, a communication method is provided. It may be understood that the method according to the first aspect may be performed by a first apparatus. The first apparatus may be a communication device, or a communication apparatus such as a chip system that can support the communication device in implementing a function needed in the method. For example, the communication device may be a second access network device. The following description uses an example in which the method is implemented by the second access network device.

The method includes: The second access network device receives a first message from a first access network device. The first message includes first indication information, and the first indication information indicates information about a current active bandwidth part BWP of a terminal device on the first access network device. Further, the second access network device determines first configuration information of the terminal device on the second access network device based on the first indication information.

According to some embodiments, a communication method is further provided. It may be understood that the method may be performed by a second apparatus. The second apparatus may be a communication device, or a communication apparatus such as a chip system that can support the communication device in implementing a function needed in the method. For example, the communication device may be a second access network device. The following description uses an example in which the method is implemented by a first access network device.

The method includes: The first access network device generates a first message. The first message includes first indication information, and the first indication information indicates information about a current active bandwidth part BWP of a terminal device on the first access network device. The first access network device sends the first message to the second access network device.

According to a third aspect, a communication method is further provided. It may be understood that the method according to the first aspect may be performed by a first apparatus. The first apparatus may be a communication device, or a communication apparatus such as a chip system that can support the communication device in implementing a function needed in the method. For example, the communication device may be a second access network device. The following description uses an example in which the method is implemented by the second access network device.

The method includes: The second access network device receives a first message from a first access network device. The first message includes first indication information, and the first indication information indicates transmission rate information of a terminal device on the first access network device. Further, the second access network device determines first configuration information of the terminal device on the second access network device based on the first indication information.

According to a fourth aspect, a communication method is further provided. It may be understood that the method according to the second aspect may be performed by a second apparatus. The second apparatus may be a communication device, or a communication apparatus such as a chip system that can support the communication device in implementing a function needed in the method. For example, the communication device may be a second access network device. The following description uses an example in which the method is implemented by a first access network device.

The method includes: The first access network device generates a first message. The first message includes first indication information, and the first indication information indicates transmission rate information of a terminal device on the first access network device. The first access network device sends the first message to the second access network device.

According to a fifth aspect, a communication method is further provided. It may be understood that the method according to the first aspect may be performed by a first apparatus. The first apparatus may be a communication device, or a communication apparatus such as a chip system that can support the communication device in implementing a function needed in the method. For example, the communication device may be a second access network device. The following description uses an example in which the method is implemented by the second access network device.

The method includes: The second access network device receives a first message from a first access network device. The first message includes first indication information, and the first indication information indicates information about a current active bandwidth part BWP of a terminal device on the first access network device and transmission rate information of the terminal device on the first access network device. Further, the second access network device determines first configuration information of the terminal device on the second access network device based on the first indication information.

According to a sixth aspect, a communication method is further provided. It may be understood that the method according to the second aspect may be performed by a second apparatus. The second apparatus may be a communication device, or a communication apparatus such as a chip system that can support the communication device in implementing a function needed in the method. For example, the communication device may be a second access network device. The following description uses an example in which the method is implemented by a first access network device.

The method includes: The first access network device generates a first message. The first message includes first indication information, and the first indication information indicates information about a current active bandwidth part BWP of a terminal device on the first access network device and transmission rate information of the terminal device on the first access network device. The first access network device sends the first message to the second access network device.

In some embodiments, the information about the current active BWP of the terminal device on the first access network device may include information about a current active downlink BWP and/or information about a current active uplink BWP. The information about the current active downlink BWP helps the second access network device determine a downlink parameter in the appropriate first configuration information. In this way, service interruption caused by switching of an active downlink BWP is reduced, and/or service interruption caused by changing of a downlink BWP configuration and changing of the active downlink BWP is reduced. The information about the current active uplink BWP helps the second access network device determine an uplink parameter in the appropriate first configuration information. In this way, service interruption caused by switching of an active uplink BWP is reduced, and/or service interruption caused by changing of an uplink BWP configuration and changing of the active uplink BWP is reduced.

In some embodiments, the information about the current active BWP of the terminal device on the first access network device may include information about one or more active BWPs. In this way, the second access network device can obtain complete related information, to help the second access network device determine the first configuration information.

In some embodiments, the information about the current active BWP of the terminal device on the first access network device may include an identifier of the current active BWP and/or bandwidth information of the current active BWP.

In some embodiments, that the second access network device determines first configuration information of the terminal device on the second access network device based on the first indication information further includes: The second access network device determines information about a first-time active BWP or BWP configuration information that matches the bandwidth information of the current active BWP of the terminal device on the first access network device. In some embodiments, the second access network device determines that a bandwidth of the first-time active BWP is the same as a bandwidth of the current active BWP of the terminal device on the first access network device.

In some embodiments, that the second access network device determines first configuration information of the terminal device on the second access network device based on the first indication information further includes: The second access network device determines the information about the first-time active BWP or the BWP configuration information that matches the transmission rate information of the terminal device on the first access network device. Further, the second access network device determines that the bandwidth of the first-time active BWP matches the transmission rate information.

In some embodiments, the transmission rate information of the terminal device on the first access network device may include uplink transmission rate information and/or downlink transmission rate information.

In some embodiments, the transmission rate information of the terminal device on the first access network device may include a transmission rate value, transmission rate level information, or transmission rate range information.

In some embodiments, the first configuration information may include the information about the first-time active BWP of the terminal device on the second access network device. Further, the information about the first-time active BWP may include an identifier of the first-time active BWP, and the identifier of the first-time active BWP may include an identifier of a first-time active uplink BWP and/or an identifier of a first-time active downlink BWP.

In some embodiments, the first configuration information may include the BWP configuration information of the terminal device on the second access network device. Further, the BWP configuration information may include uplink BWP configuration information and/or downlink BWP configuration information.

In some embodiments, the first configuration information may include the information about the first-time active BWP and the BWP configuration information of the terminal device on the second access network device. Further, the information about the first-time active BWP may include the identifier of the first-time active BWP, and the identifier of the first-time active BWP may include the identifier of the first-time active uplink BWP and/or the identifier of the first-time active downlink BWP. The BWP configuration information may include the uplink BWP configuration information and/or the downlink BWP configuration information.

In some embodiments, in a handover scenario based on an Xn interface, the first access network device generates the first message, and the first access network device sends the first message to the second access network device. The first message may be a handover request message in an XnAP protocol, and the handover request message includes the first indication information. The second access network device determines the first configuration information based on the first indication information, and then sends a second message to the first access network device. The second message may be a handover request acknowledgment message in the XnAP protocol, and the handover request acknowledgment message includes the first configuration information. The first access network device sends the first configuration information to the terminal device. After being handed over to the second access network device, the terminal device uses the first configuration information on the second access network device.

In some embodiments, in a handover scenario based on an NG interface, the first access network device generates the first message, and the first access network device sends the first message to the second access network device. The first message may be a handover preparation information message, which is an inter-node RRC message. The handover preparation information message includes the first indication information. The second access network device determines the first configuration information based on the first indication information, and then sends the second message to the first access network device. The second message may be a handover command message, which is an inter-node RRC message, and the handover command message includes the first configuration information. The first access network device sends the first configuration information to the terminal device. After being handed over to the second access network device, the terminal device uses the first configuration information on the second access network device.

In some embodiments, based on an RRC re-establishment scenario, the first access network device receives a third message sent by the second access network device. The third message may be a retrieve UE context request message of the XnAP protocol. The first access network device generates the first message, and the first access network device sends the first message to the second access network device. The first message may be a retrieve UE context response message of the XnAP protocol, and the retrieve UE context response message includes the first indication information. The second access network device determines the first configuration information based on the first indication information, and then sends the first configuration information to the terminal device. The terminal device uses the first configuration information on the second access network device.

In some embodiments, a communication apparatus is provided. The communication apparatus has a function of implementing behavior in the methods according to the first aspect, the third aspect, and the fifth aspect. The function may be implemented by hardware, or may be implemented by hardware executing corresponding software. The hardware or software includes one or more modules corresponding to the foregoing functions. In some embodiments, the communication apparatus includes: a receiving unit, configured to receive a first message from a first access network device, where the first message includes first indication information, and the first indication information indicates information about a current active bandwidth part BWP of a terminal device on the first access network device and/or transmission rate information of the terminal device on the first access network device; a processing unit, configured to determine first configuration information of the terminal device on a second access network device based on the first indication information; and optionally a sending unit, configured to send a second message to the first access network device, where the second message includes the first configuration information; or optionally a sending unit, configured to send a third message to the first access network device before the receiving unit receives the first message from the first access network device, where the third message is used to request to obtain context information of the terminal device. These modules may perform corresponding functions in the method examples in the first aspect, the third aspect, and the fifth aspect. For details, refer to the detailed descriptions in the method examples. Details are not described herein again.

In some embodiments, a communication apparatus is provided. The communication apparatus has a function of implementing behavior in the method according to the second aspect, the fourth aspect, or the sixth aspect. The function may be implemented by hardware, or may be implemented by hardware executing corresponding software. The hardware or the software includes one or more modules corresponding to the function. In some embodiments, the communication apparatus includes: a processing unit, configured to generate a first message, where the first message includes first indication information, and the first indication information indicates information about a current active bandwidth part BWP of a terminal device on a first access network device and/or transmission rate information of the terminal device on the first access network device; a sending unit, configured to send the first message to a second access network device; and optionally a receiving unit, configured to receive a second message from the second access network device, where the second message includes first configuration information of the terminal device on the second access network device, and the first configuration information is determined based on the first indication information; or optionally a receiving unit, configured to receive a third message from the second access network device before the processing unit generates the first message, where the third message is used to request to obtain context information of the terminal device. These modules may perform corresponding functions in the method examples in the second aspect, the fourth aspect, and the sixth aspect. For details, refer to the detailed descriptions in the method examples. Details are not described herein again.

In some embodiments, a communication apparatus is provided. The communication apparatus may be the communication apparatus in any one of the first aspect to the sixth aspect, or a chip disposed in the communication apparatus in any one of the first aspect to the sixth aspect. The communication apparatus includes a communication interface and a processor, and In some embodiments, further includes a memory. The memory is configured to store a computer program, instructions, or data. The processor is coupled to the memory and the communication interface. When the processor reads the computer program, the instructions, or the data, the communication apparatus is enabled to perform the method performed by the first access network device or the second access network device in each aspect.

It should be understood that the communication interface may be a transceiver in the communication apparatus, and is implemented, for example, by using an antenna, a feeder, and a codec in the communication apparatus. Alternatively, if the communication apparatus is a chip disposed in an access network device, the communication interface may be an input/output interface of the chip, for example, an input/output pin. The transceiver is used by the communication apparatus to communicate with another device. For example, when the communication apparatus is a terminal device, the another device is an access network device. Alternatively, when the communication apparatus is an access network device, the another device is a terminal device.

In some embodiments, this application provides a chip system. The chip system includes a processor, configured to implement the method performed by the communication apparatus in any one of the first aspect to the sixth aspect. In some embodiments, the chip system further includes a memory, configured to store program instructions and/or data. The chip system may include a chip, or may include a chip and another discrete component.

In some embodiments, this application provides a communication system. The system includes the communication apparatus in the first aspect and the communication apparatus in the method of the second aspect, or includes the communication apparatus in the third aspect and the communication apparatus in the fourth aspect, or includes the communication apparatus in the fifth aspect and the communication apparatus in the sixth aspect, or includes the methods in the first aspect and the second aspect, or includes the methods in the third aspect and the fourth aspect, or includes the methods in the fifth aspect and the sixth aspect.

In some embodiments, a computer program product is provided. The computer program product includes computer program code. When the computer program code is run, the methods performed by the first access network device in the foregoing aspects are performed, the methods performed by the second access network device in the foregoing aspects are performed, or the methods performed by the terminal device in the foregoing aspects are performed.

In some embodiments, this application provides a computer-readable storage medium. The computer-readable storage medium stores a computer program. When the computer program is run, the methods performed by the first access network device in the foregoing aspects are implemented, the methods performed by the second access network device in the foregoing aspects are implemented, or the methods performed by the terminal device in the foregoing aspects are implemented.

DESCRIPTION OF EMBODIMENTS

In the specification, claims, and accompanying drawings of this application, the terms "first", "second", "third" and the like are intended to distinguish between different objects but do not limit a particular sequence. In addition, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme.

The following clearly and completely describes the technical solutions in embodiments of this application with reference to the accompanying drawings in embodiments of this application. It is clear that the described embodiments are merely some but not all of embodiments of this application. All other embodiments obtained by a person of ordinary skill in the art based on embodiments of this application without creative efforts shall fall within the protection scope of this application.

Figure 1:
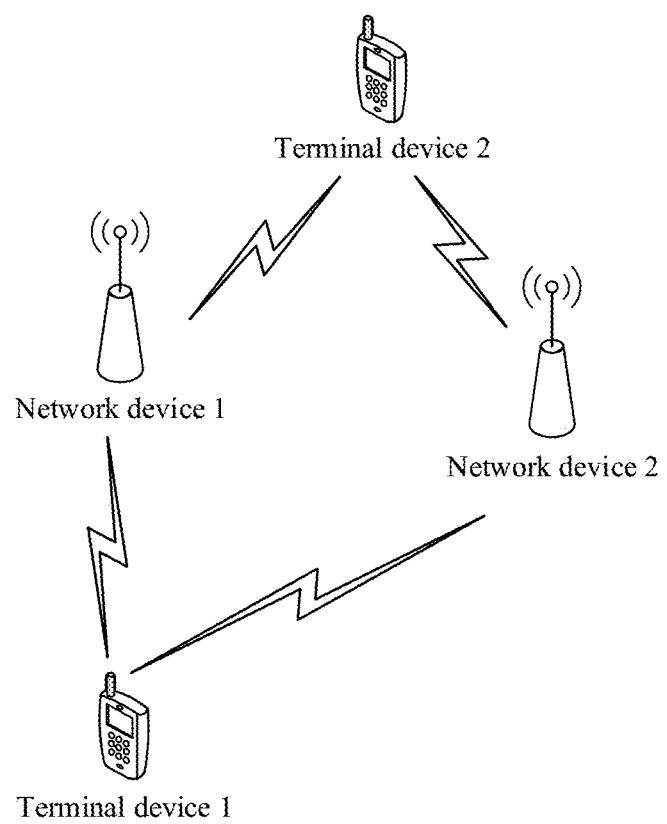
FIG. 1 is a schematic diagram of an architecture of a communication system to which an embodiment of this application is applied.

The technical solutions of embodiments of this application described below may be applied to a network architecture shown in FIG. 1. FIG. 1 is merely an example of a communication system. The communication system may include a plurality of terminal devices and a plurality of network devices. In FIG. 1, an example in which two terminal devices and two network devices are included is used. Certainly, a quantity of terminal devices in FIG. 1 is merely an example, and there may be fewer or more terminal devices. Any network device may provide a service for a terminal device within coverage.

The terminal device may also be referred to as a terminal device, and may be a device that provides voice and/or data connectivity for a user, for example, may be a handheld device having a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a device-to-device (D2D) communication terminal device, a V2X terminal device, a machine-to-machine/machine type communication (M2M/MTC) terminal device, an internet of things (IoT) terminal device, a subscriber unit (SU), a subscriber station (SS), a mobile station, a remote station, an access point (AP), a remote terminal, an access terminal, a user terminal, a user agent, an aircraft (such as a drone, a hot air balloon, or a civil aviation passenger aircraft), a user device, or the like. For example, the terminal device may include a mobile phone (or referred to as a "cellular" phone), a computer with a mobile terminal device, or a portable, pocket-sized, handheld, or computer built-in mobile apparatus. For example, it may be a device such as a personal communication service (PCS) phone, a cordless telephone, a session initiation protocol (SIP) phone, a wireless local loop (WLL) station, or a personal digital assistant (PDA). The terminal device alternatively includes a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example, and not limitation, in this embodiment of this application, the terminal device may alternatively be a wearable device. The wearable device may also be referred to as a wearable intelligent device, an intelligent wearable device, or the like, and is a general term of wearable devices, such as glasses, gloves, watches, clothes, and shoes, that are intelligently designed and developed for daily wear by applying wearable technologies. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, such as smart watches or smart glasses, and devices that focus on only one type of application function and need to be used with other devices such as smartphones, such as various smart bands, smart helmets, or smart jewelry for monitoring physical signs.

The network device may be an access network device. The access network device may also be referred to as a radio access network (RAN) device, and is a device that communicates with a wireless terminal over an air interface in an access network by using one or more sectors, or may be considered as a device that provides a wireless communication function for a terminal device. The access network device includes, for example, but is not limited to, a next generation NodeB (gNB), an evolved NodeB (eNB), a baseband unit (BBU), a transmitting and receiving point (TRP), a transmitting point (TP) in 5G, a base station in a future mobile communication system, or an access point in a Wi-Fi system. Alternatively, the access network device may be a radio controller, a central unit (CU), and/or a distributed unit (DU) in a cloud radio access network (CRAN) scenario, or the network device may be a relay station, a vehicle-mounted device, a network device in a future evolved PLMN network, or the like.

The CU and the DU may be physically separated or deployed together. A plurality of DUs may share one CU. One DU may be connected to a plurality of CUs. The CU and the DU may be connected through an interface, for example, an F1 interface. The CU and the DU may be obtained through division based on protocol layers of a wireless network. For example, a possible division manner is that the CU is configured to perform functions of a radio resource control (RRC) layer, a service data adaptation protocol (SDAP) layer, and a packet data convergence protocol (PDCP) layer, and the DU is configured to perform functions of a radio link control (RLC) layer, a media access control (MAC) layer, a physical layer, and the like. It may be understood that, division into processing functions of the CU and the DU based on the protocol layers is merely an example, and there may be another division manner. For example, the CU or the DU may have functions of more protocol layers through division. For example, the CU or the DU may alternatively have some processing functions of the protocol layers through division. In some embodiments, some functions of the RLC layer and functions of a protocol layer above the RLC layer are distributed in the CU, and remaining functions of the RLC layer and functions of a protocol layer below the RLC layer are distributed in the DU. In some embodiments, functions of the CU or the DU may alternatively be obtained through division based on a service type or another system requirement. For example, division is performed based on a latency, a function whose processing time needs to satisfy a latency requirement is disposed on the DU, and a function whose processing time does not need to satisfy the latency requirement is disposed on the CU. The network architecture shown in the figure may be applied to a 5G communication system, and may alternatively share one or more components or resources with an LTE system. In some embodiments, the CU may alternatively have one or more functions of the core network. One or more CUs may be set in a centralized manner or a split manner. For example, the CUS may be disposed on a network side for ease of centralized management. The DU may have a plurality of radio frequency functions, or the radio frequency functions may be set remotely.

Functions of the CU may be implemented by one entity, or may be implemented by different entities. For example, the functions of the CU may be further divided. For example, a control plane (CP) and a user plane (UP), namely, a control plane of the CU (CU-CP) and a user plane of the CU (CU-UP), are separated. For example, the CU-CP and the CU-UP may be implemented by different function entities. The CU-CP and the CU-UP may be coupled to the DU to jointly implement functions of the access network device.

The terminal device may communicate with access network devices using different technologies. For example, the terminal device may communicate with an access network device supporting long term evolution (LTE), may communicate with an access network device supporting 5G, or may communicate with both an access network device supporting LTE and an access network device supporting 5G. This is not limited in embodiments of this application.

To facilitate understanding of this application, related concepts in embodiments of this application are described herein.

After the terminal device enters a radio resource control (RRC) connected mode, the access network device may configure at least one bandwidth part (BWP) (which may alternatively be referred to as a bandwidth part, and is described by using the bandwidth part in this application for ease of description) for the terminal device by using RRC signaling. A configuration of each BWP may include a BWP identifier, a frequency domain location, a transmission bandwidth size, and a used subcarrier spacing, and In some embodiments, may further include a cyclic prefix. A transmission bandwidth included in each BWP is not greater than a bandwidth capability supported by the terminal device. Regardless of a system bandwidth of the access network device, the access network device may configure, for the terminal device, a frequency domain resource range that matches the bandwidth capability of the terminal device, to ensure subsequent data transmission between the access network device and the terminal. In the at least one BWP configured for one terminal device, frequency domain resources included in different BWPs may overlap or may not overlap, and BWPs configured for different terminal devices may be the same or may be different. Therefore, even if bandwidth capabilities of different terminal devices are the same, the access network device may configure BWPs with different transmission bandwidths for the different terminal devices. In some embodiments, currently, in consideration of complexity, for a terminal device, in each of an uplink direction and a downlink direction, the access network device configures a maximum of four BWPs (e.g., a maximum of four uplink BWPs and a maximum of four downlink BWPs). For each of the uplink direction and the downlink direction, one of the four BWPs is an active BWP, and data transmission between the access network device and the terminal device is performed in a frequency domain resource range corresponding to the active BWP. The access network device may configure or switch the active BWP by using RRC signaling, or may implement dynamical switching of the active BWP by using downlink control information (DCI), so that the terminal device can perform data transmission with the access network device in different BWPs, to adapt to different scenarios, ensure data transmission efficiency, and save power. For example, at a first moment, a service volume of the terminal device is large, and the access network device switches to (activates) a BWP with a large bandwidth for the terminal device, to meet a requirement for transmitting a large amount of data. At a second moment, a service volume of the terminal device is small, and the access network device switches to (activates) a BWP with a small bandwidth for the terminal device, to meet a basic communication requirement. This saves power of the terminal device. However, a switching operation for the active BWP causes long service interruption time because the terminal device may need to switch an operating frequency or bandwidth.

In a moving process of the terminal device, it is inevitable that a terminal device that is using a service of an access network device moves to coverage of another access network device. Therefore, to ensure communication continuity and quality of the service, a communication link between the terminal device and a cell needs to be transferred to another cell. In other words, the terminal device is handed over from a cell of a source access network device to a cell of a target access network device. In a handover process, the target access network device configures, for the terminal device, a BWP configuration and an identifier of a first-time active BWP that are used by the terminal device after the terminal device is handed over to the target access network device. The first-time active BWP is one of at least one BWP configured by the target access network device for the terminal device in the BWP configuration. After being handed over to the target access network device, the terminal device uses the first-time active BWP as a BWP used for current communication. In other words, the terminal device performs data transmission with the target access network device by using the first-time active BWP. However, when the target access network device configures the BWP configuration for the terminal device and determines the first-time active BWP based on a configuration of the target access network device and a capability of the terminal device, the following case may appear. For example, when a handover occurs, the terminal device has a large quantity of data transmission requirements, and a bandwidth of the first-time active BWP determined by the target access network device is narrow. After the terminal device is handed over to the target access network device, the bandwidth of the narrow active BWP may not meet a transmission requirement, and the target access network device needs to change the active BWP to a BWP with a wider bandwidth. The changing of the active BWP causes long service interruption time. Further, if there is no BWP with a high bandwidth in the configured BWP, the target access network device needs to configure and activate a BWP with a high bandwidth for the terminal device by using RRC signaling. This causes longer service interruption time.

In view of this, the technical solutions in embodiments of this application are provided. The technical solutions provided in embodiments of this application are described below in detail with reference to the accompanying drawings.

Figure 2:
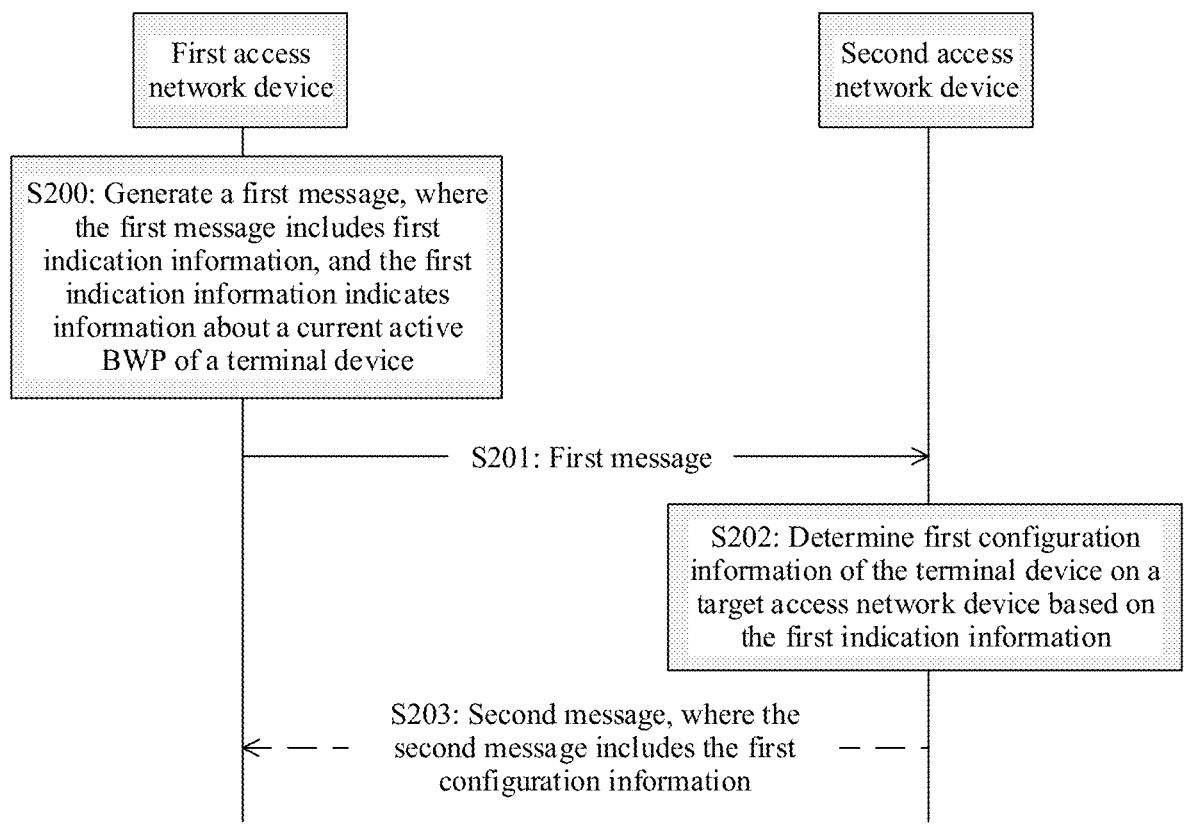
FIG. 2 is a flowchart of an example of a communication method according to an embodiment of this application.

An embodiment of this application provides a communication method. FIG. 2 is a flowchart of the method. In the following descriptions, an example in which the method is applied to the communication system shown in FIG. 1 is used. In addition, the method may be performed by two communication apparatuses. For example, the two communication apparatuses are a first access network device and a second access network device. The first access network device may be a base station or a communication apparatus (for example, a chip system) that can support the base station in implementing a function needed in the method, or certainly may be another communication apparatus. The second access network device may be a base station or a communication apparatus (for example, a chip system) that can support the base station in implementing a function needed in the method, or certainly may be another communication apparatus. In addition, embodiments of the first access network device and the second access network device are not limited. For example, the two access network devices may be implemented in a same form. For example, the two access network devices are implemented in a form of a device. Alternatively, the two access network devices may be implemented in different forms. For example, the first access network device is implemented in a form of a device, and the second access network device is implemented in a form of a chip system.

For ease of description, in the following descriptions, an example in which the method is performed by the first access network device and the second access network device is used. In some embodiments, the first access network device may be a source access network device of a terminal device in a handover process or an RRC re-establishment process, and the second access network device may be a target access network device of the terminal device in the handover process or the RRC re-establishment process. For example, as the terminal device moves, the terminal device moves from a coverage area of the first access network device to a coverage area of the second access network device, and the first access network device determines to hand over the terminal device to the second access network device. This is a handover scenario. The handover scenario may include a handover scenario based on an Xn interface and a handover scenario based on a next generation (NG) interface. When the terminal device encounters a case, for example, a radio link failure or an integrity check failure, on the first access network device, the terminal device selects the second access network device to initiate the RRC re-establishment process. This is an RRC re-establishment scenario.

S200: The first access network device generates a first message.

The first message may include first indication information. The first indication information indicates information about a current active BWP of the terminal device on the first access network device.

After the terminal device enters an RRC connected mode, the first access network device configures one or more BWPs for the terminal device. Table 1 is used as an example, and three BWPs are configured. The first access network device performs data transmission with the terminal device on the active BWP. The first access network device may change the active BWP based on an actual situation.

TABLE 1

| BWP identifier | Bandwidth |
| --- | --- |
| 1 | 10 MHz |
| 2 | 20 MHz |
| 3 | 50 MHz |

In the handover scenario or the RRC re-establishment scenario, a serving access network device of the terminal device may be changed from the first access network device to the second access network device. The first access network device generates the first message. The first message may include the first indication information, and the first indication information indicates the information about the current active BWP of the terminal device on the first access network device. The current active BWP herein may be an active BWP of the terminal device on the first access network device when operation S200 is performed in the handover scenario, that is, when the first message is generated. Alternatively, the current active BWP is a last active BWP of the terminal device on the first access network device in the RRC re-establishment scenario.

In some embodiments, the information about the current active BWP of the terminal device on the first access network device includes an identifier of the current active BWP.

In some embodiments, the first message also carries configuration information of the one or more BWPs configured by the first access network device for the terminal device. The configuration information of the BWPs may include an identifier of the one or more BWPs, a frequency domain location corresponding to the identifier of the BWPs, a transmission bandwidth size, and a used subcarrier spacing, and In some embodiments, may further include a cyclic prefix. It may be understood that the current active BWP is one of the one or more BWPs.

After receiving the first message in operation S201, the second access network device may obtain configuration information of the current active BWP of the terminal device on the first access network device based on the identifier of the current active BWP of the terminal device on the first access network device and BWP configuration information of the terminal device on the first access network device, including information such as a bandwidth of the current active BWP.

Table 1 is used as an example. If the identifier of the current active BWP of the terminal device on the first access network device is 3, the information about the current active BWP includes a BWP identifier 3, and the second access network device can learn, based on the BWP configuration information (namely, information in Table 1) of the terminal device on the first access network device and the BWP identifier 3, that the bandwidth of the current active BWP is 50 MHz.

In some embodiments, the information about the current active BWP of the terminal device on the first access network device includes bandwidth information of the current active BWP. The bandwidth information may be a bandwidth value, a bandwidth range, or a bandwidth level, for example, a large bandwidth, a medium bandwidth, or a small bandwidth. Table 1 is used as an example. If the identifier of the current active BWP is 3, the information about the current active BWP indicates that a BWP bandwidth is 50 MHz, or the information about the current active BWP includes an enumerated value, where the enumerated value indicates a bandwidth range, and the bandwidth of the current active BWP is within the bandwidth range, for example, "40 MHz to 60 MHz", or the information about the current active BWP includes an enumerated value, where the enumerated value indicates a "large bandwidth".

In some embodiments, the information about the current active BWP of the terminal device on the first access network device includes the identifier of the current active BWP and the bandwidth information of the current active BWP.

It should be noted that, although currently, a terminal device generally can be configured with a maximum of four BWPs in one direction at a same moment and supports only one active BWP, the terminal device may support a plurality of active BWPs in one direction at a same moment in the future. For example, in the future, a maximum of eight BWPs are supported in one direction, and there may be two or more active BWPs. Therefore, in some embodiments, the information about the current active BWP may include an identifier of one or more active BWPs, or bandwidth information of one or more active BWPs in one direction, for example, include an identifier and/or bandwidth information of all current active BWPs.

Data transmission between the terminal device and the access network device is divided into two directions: sending, by the access network device, data to the terminal device, that is, downlink data transmission; and sending, by the terminal device, data to the access network device, that is, uplink data transmission. Correspondingly, the access network device configures an uplink BWP and a downlink BWP for the terminal device, and the uplink and the downlink each have a current active BWP. Therefore, the information about the current active BWP of the terminal device on the first access network device may include information about a current active downlink BWP, or information about a current active uplink BWP, or the information about the current active downlink BWP and the information about the current active uplink BWP. Correspondingly, the identifier of the current active BWP includes an identifier of the current active downlink BWP and/or an identifier of the current active uplink BWP, and the bandwidth of the current active BWP includes a bandwidth of the current active downlink BWP and/or a bandwidth of the current active uplink BWP.

In some embodiments, for the handover scenario based on an Xn interface, the first message may be a handover request message (namely, a handover request) of an Xn application protocol (XnAP), and the handover request message carries the first indication information. In other words, the first indication information is an information element in the handover request message. Alternatively, because the handover request message carries a container information element, the container is an inter-node RRC message, and the inter-node RRC message is a handover preparation information message (namely, handover preparation information), it may also be considered that the first message is the handover preparation information message. In other words, the first indication information is an information element in the handover preparation information message.

In some embodiments, for the handover scenario based on a next generation (NG) interface, the first message may be an inter-node RRC message, and the RRC message may be a handover preparation information message. In other words, the first indication information is an information element in the handover preparation information message.

In some embodiments, for the RRC re-establishment scenario, the first message may be a retrieve UE context response message (namely, RETRIEVE UE CONTEXT RESPONSE) of the XnAP protocol, and the retrieve UE context response message carries the first indication information. In other words, the first indication information is an information element in the retrieve UE context response message. Alternatively, because the retrieve UE context response message carries a container information element, the container is an inter-node RRC message, and the inter-node RRC message is a handover preparation information message (namely, Handover Preparation Information), it may also be considered that the first message is the handover preparation information message. In other words, the first indication information is an information element in the handover preparation information message. In some embodiments, before the first access network device generates the first message, the second access network device receives an RRC re-establishment request message sent by the terminal device. The second access network device sends a third message to the first access network device. The first access network device receives the third message sent by the second access network device. The third message may be a retrieve UE context request message (namely, RETRIEVE UE CONTEXT REQUEST) of the XnAP protocol, and is used to request to obtain context information of the terminal device. After the first access network device receives the third message, the first access network device generates the first message.

S201: The first access network device sends the first message to the second access network device.

Correspondingly, the second access network device receives the first message. For a name and content of the first message, refer to related descriptions in S200. Details are not described herein again.

S202: The second access network device determines first configuration information of the terminal device on the second access network device based on the first indication information.

The second access network device may determine, based on the first indication information, the first configuration information used by the terminal device on the second access network device after the terminal device is handed over to the second access network device. For example, as described in operation S201, the second access network device may obtain the bandwidth information of the current active BWP of the terminal device on the first access network device based on the first indication information, and then may determine the matched first configuration information based on the bandwidth information of the active BWP. In some embodiments, in this embodiment of this application, "matched" may include that values are the same or similar, or may include that levels or ranges are the same or similar. This is not limited in this embodiment of this application. "Similar" may be that an absolute value of a difference between the two is within a range (for example, less than or equal to a threshold). If there are no same or similar ones, "matched" may include a nearest value, level, or range.

In some embodiments, the first configuration information may include information about a first-time active BWP of the terminal device on the second access network device, and the information about the first-time active BWP may include an identifier of the first-time active BWP. The first-time active BWP is a first active BWP (namely, firstActiveBWP) used after the terminal device accesses the access network device. For example, the first-time active BWP may be a first active BWP of the terminal device on the target access network device in the handover or RRC re-establishment scenario. It may be understood that if the second access network device determines, based on the first indication information, the information about the first-time active BWP of the terminal device on the second access network device, BWP configuration information of the terminal device on the second access network device may be determined based on the first indication information, or may be determined in a conventional manner. Regardless of a manner in which the BWP configuration information of the terminal device on the second access network device is determined, the second access network device sends the BWP configuration information to the terminal device. In this case, the terminal device may determine configuration information of the first-time active BWP based on the received information about the first-time active BWP and the BWP configuration information, to perform data transmission based on the configuration information of the first-time active BWP.

For example, the second access network device may determine, based on the information about the current active BWP of the terminal device on the first access network device, that the terminal device also has a same or similar data transmission requirement on the second access network device. The second access network device may configure information about a first-time active BWP that matches the current active BWP of the terminal device on the first access network device or matches a data transmission requirement of the terminal device. For example, the second access network device configures a BWP with a bandwidth that is the same as or similar to the bandwidth of the current active BWP of the terminal device on the first access network device as the first-time active BWP.

Table 1 is used as an example. If the current active BWP of the terminal device on the first access network device is a BWP 3, the information about the current active BWP includes an identifier 3 of the current active BWP or a bandwidth of 50 MHz of the current active BWP. In this case, the second access network device learns, based on the information about the current active BWP, that the bandwidth of the current active BWP is 50 MHz. The second access network device may determine that a current data transmission requirement of the terminal device is large, and may select, or determine, from a plurality of BWPs configured by the second access network device for the terminal device, a BWP whose bandwidth is the same as or similar to 50 MHz as the first-time active BWP, to meet the data transmission requirement. For example, if the second access network device configures three BWPs for the terminal device, and bandwidths of the three BWPs are respectively 20 MHZ, 30 MHz, and 50 MHz, a BWP with a same bandwidth of 50 MHz may be selected as the first-time active BWP, and the first configuration information is set to a BWP identifier of the BWP with the bandwidth of 50 MHz. For another example, if the second access network device configures three BWPs for the terminal device, and bandwidths of the three BWPs are respectively 20 MHZ, 30 MHz, and 40 MHz, a BWP with a similar bandwidth of 40 MHz is selected as the first-time active BWP, and the first configuration information is set to a BWP identifier of the BWP with the bandwidth of 40 MHz. If the current active BWP of the terminal device on the first access network device is a BWP 1, and the information about the current active BWP includes an identifier 1 of the current active BWP or a bandwidth of 10 MHz of the current active BWP, the second access network device learns, based on the information about the current active BWP, that the bandwidth of the active BWP is 10 MHZ. The second access network device can estimate that the current data transmission requirement of the terminal device is small, and may select, or determine, from the plurality of configured BWPs, a BWP whose bandwidth is the same as or similar to 10 MHz as the first-time active BWP, to meet a power saving requirement of the terminal device. For example, if the second access network device configures three BWPs for the terminal device, and bandwidths of the three BWPs are respectively 10 MHZ, 30 MHz, and 50 MHz, a BWP with a same bandwidth of 10 MHz is selected as the first-time active BWP, and the first configuration information is set to a BWP identifier of the BWP with the bandwidth of 10 MHz. For another example, if the second access network device configures three BWPs for the terminal device, and bandwidths of the three BWPs are respectively 15 MHz, 30 MHz, and 40 MHz, a BWP with a similar bandwidth of 15 MHz is selected as the first-time active BWP, and the first configuration information is set to a BWP identifier of the BWP with the bandwidth of 15 MHZ.

For example, Table 1 is used as an example. If the current active BWP of the terminal device on the first access network device is the BWP 3, and the information about the current active BWP includes that the bandwidth information of the current active BWP is a "large bandwidth", the second access network device may determine, based on the "large bandwidth", that the current data transmission requirement of the terminal device is large, and may select, or determine, from the plurality of BWPs configured by the second access network device for the terminal device, a BWP with a large bandwidth as the first-time active BWP. For example, if the second access network device configures three BWPs for the terminal device, and bandwidths of the three BWPs are respectively 20 MHZ, 30 MHz, and 50 MHz, a BWP with a large bandwidth of 50 MHz is selected as the first-time active BWP, and the first configuration information is set to a BWP identifier of the BWP with the bandwidth of 50 MHz. If the current active BWP of the terminal device on the first access network device is the BWP 1, and the information about the current active BWP includes that the bandwidth information of the current active BWP is a "small bandwidth", the second access network device can estimate, based on the "small bandwidth", that the current data transmission requirement of the terminal device is small, and may select, or determine, from the plurality of configured BWPs, a BWP with a small bandwidth as the first-time active BWP. For example, if the second access network device configures three BWPs for the terminal device, and bandwidths of the three BWPs are respectively 10 MHZ, 30 MHZ, and 50 MHz, a BWP with a small bandwidth of 10 MHz is selected as the first-time active BWP, and the first configuration information is set to a BWP identifier of the BWP with the bandwidth of 10 MHz.

For example, Table 1 is used as an example. If the current active BWP of the terminal device on the first access network device is the BWP 3, and the information about the current active BWP includes that the bandwidth information of the current active BWP is "40 MHz to 60 MHz", the second access network device may determine, based on the "40 MHz to 60 MHz", that the current data transmission requirement of the terminal device is large, and may select, or determine, from the plurality of BWPs configured by the second access network device for the terminal device, a BWP whose bandwidth is in a range of "40 MHz to 60 MHz" as the first-time active BWP. For example, if the second access network device configures three BWPs for the terminal device, and bandwidths of the three BWPs are respectively 20 MHZ, 30 MHZ, and 50 MHz, a BWP with a bandwidth of 50 MHz is selected as the first-time active BWP, and the first configuration information is set to a BWP identifier of the BWP with the bandwidth of 50 MHz. If the current active BWP of the terminal device on the first access network device is the BWP 1, and the information about the current active BWP includes that the bandwidth information of the current active BWP is "0 MHz to 15 MHz", the second access network device can estimate, based on the "0 MHz to 15 MHz", that the current data transmission requirement of the terminal device is small, and may select, or determine, from the plurality of configured BWPs, a BWP whose bandwidth is in a range of "40 MHz to 60 MHz" as the first-time active BWP. For example, if the second access network device configures three BWPs for the terminal device, and bandwidths of the three BWPs are respectively 10 MHZ, 30 MHZ, and 50 MHz, a BWP with a bandwidth of 10 MHz is selected as the first-time active BWP, and the first configuration information is set to a BWP identifier of the BWP with the bandwidth of 10 MHz.

If there is no first indication information, the following case may appear: If a bandwidth of the first-time active BWP selected by the second access network device is excessively small, the active BWP needs to be changed to a BWP with a larger bandwidth again to meet the data transmission requirement. If the bandwidth of the first-time active BWP selected by the second access network device is excessively large, the active BWP needs to be changed to a BWP with a smaller bandwidth again to meet the power saving requirement of the terminal. Therefore, according to the method in some embodiments, an action that the terminal device needs to change the active BWP after the terminal device is handed over to the second access network device can be avoided or reduced, to further reduce caused service interruption.

It should be noted that, generally, the bandwidth of the first-time active BWP on the second access network device may be the same as the bandwidth of the current active BWP on the first access network device, but the bandwidth of the first-time active BWP may alternatively be different from the bandwidth of the current active BWP on the first access network device. When the second access network device determines the appropriate first-time active BWP based on the current active BWP, some other factors may also be considered. For example, if the bandwidth of the current active BWP is 50 MHz, but the second access network device supports configuration of a BWP bandwidth of a maximum of 40 MHz, the second access network device may select, from the configured BWPs for the terminal device, a BWP with the bandwidth of 40 MHz as the first-time active BWP. For another example, the bandwidth of the current active BWP is 10 MHZ, but the second access network device estimates, based on, for example, historical information, that the data transmission requirement increases after the terminal device accesses the second access network device. In this case, the second access network device may select, from the configured BWPs for the terminal device, a BWP with a bandwidth of 20 MHz as the first-time active BWP.

In some embodiments, the first configuration information may be the BWP configuration information. It may be understood that when the second access network device determines the BWP configuration information of the terminal device on the second access network device based on the first indication information, the information about the first-time active BWP of the terminal device on the second access network device may be determined based on the first indication information, or may be determined in a conventional manner. Regardless of a manner in which the information about the first-time active BWP of the terminal device on the second access network device is determined, the second access network device sends the information about the first-time active BWP to the terminal device. In this case, the terminal device may determine the configuration information of the first-time active BWP based on the received information about the first-time active BWP and the BWP configuration information, to perform data transmission based on the configuration information of the first-time active BWP.

For example, the data transmission requirement of the terminal device can be determined based on the information about the current active BWP of the terminal device on the first access network device, so that the second access network device can configure the matched BWP configuration information based on the data transmission requirement.

For example, the second access network device may first determine, based on the determined data transmission requirement or directly based on the information about the current active BWP, to configure a matched BWP with a bandwidth of X for the terminal device. To meet a higher or lower data transmission requirement of the terminal device, the second access network device may further configure a BWP with a bandwidth lower than X but with a difference between the bandwidth and X being within a first threshold range and a BWP with a bandwidth higher than X but with a difference between the bandwidth and X being within a second threshold range. Values of the first threshold and the second threshold may be determined by the second access network device. Table 1 is used as an example. If the current active BWP of the terminal device on the first access network device is the BWP 3, the second access network device learns that the bandwidth of the active BWP is 50 MHz, the second access network device can determine that the current data transmission requirement of the terminal device is large, and one BWP with a bandwidth of 20 MHz and one BWP with a bandwidth of 70 MHz may be further configured in addition to the matched BWP with the bandwidth of 50 MHz. Refer to Table 2.

TABLE 2

| BWP identifier | Bandwidth |
|---|---|
| 1 | 20 MHz |
| 2 | 50 MHz |
| 3 | 70 MHz |

Therefore, according to the method in some embodiments, an action that the terminal device needs to change a BWP configuration after the terminal device is handed over to the second access network device can be avoided or reduced, to further reduce caused service interruption.

It should be noted that, with reference to some of the embodiments, the first configuration information may include not only the information about the first-time active BWP, but also the BWP configuration information. In some embodiments, the second access network device determines the matched BWP configuration information based on the first indication information, and also determines the information about the matched first-time active BWP based on the first indication information. Table 2 is used as an example. The second access network device determines the BWP configuration information in Table 2 based on the first indication information, and may also determine, based on the first indication information, that the first-time active BWP is a BWP 2. In this way, service interruption caused by switching of the active BWP is reduced, and service interruption caused by changing of the BWP configuration and changing of the active BWP is reduced.

The information about the current active BWP received by the second access network device from the first access network device may include the information about the current active uplink BWP and/or the information about the current active downlink BWP. Correspondingly, the information about the first-time active BWP determined by the second access network device based on the information about the current active BWP received from the first access network device may include information about a first-time active uplink BWP, for example, an identifier of the first-time active uplink BWP firstActiveUplinkBWP-Id, and/or information about a first-time active downlink BWP, for example, an identifier of the first-time active downlink BWP firstActiveDownlinkBWP-Id. Similarly, the BWP configuration information determined by the second access network device based on the information about the current active BWP received from the first access network device may include uplink BWP configuration information and/or downlink BWP configuration information.

For example, uplink and downlink transmission requirements may be inconsistent. For example, if the terminal device is downloading a file, a downlink transmission requirement is large, but an uplink transmission requirement is small. Therefore, the information about the first-time active uplink BWP and/or the uplink BWP configuration information on the second access network device may be determined based on the information about the current active uplink BWP on the first access network device, and the information about the first-time active downlink BWP and/or the downlink BWP configuration information on the second access network device may be determined based on the information about the current active downlink BWP on the first access network device.

In the RRC re-establishment scenario, the second access network device sends an RRC reconfiguration message to the terminal device. The RRC reconfiguration message includes the first configuration information. After receiving the message, the terminal device uses the first configuration information, for example, uses the first-time active BWP as the active BWP of the terminal device. In the handover scenario, the following operation S203 may be performed.

S203: The second access network device sends a second message to the first access network device.

Correspondingly, the first access network device receives the second message. The second message includes the first configuration information.

If the first message in operation S201 is the handover request message of the XnAP protocol in the handover scenario, the second message may be a handover request acknowledgment message (namely, HANDOVER REQUEST ACKNOWLEDGE) of the XnAP protocol. It should be noted that the handover request acknowledgment message includes a container, the container is an inter-node RRC message, the inter-node RRC message is a handover command message, the handover command message includes the RRC reconfiguration message, and the RRC reconfiguration message further includes the first configuration information.

If the first message in operation S201 is the inter-node RRC message such as the handover preparation information message in the handover scenario, the second message may be an inter-node RRC message such as a handover command message (namely, a Handover Command). The handover command message includes the RRC reconfiguration message, and the RRC reconfiguration message further includes the first configuration information.

In some embodiments, the first access network device sends the first configuration information to the terminal device. The first access network device obtains the RRC reconfiguration message from the second message in operation S203. The RRC reconfiguration message includes the first configuration information. The first access network device sends the RRC reconfiguration message to the terminal device, to indicate the terminal device to hand over from the first access network device to the second access network device. After the terminal device is handed over to the second access network device, the terminal device uses the first configuration information on the second access network device, for example, uses the first-time active BWP as the active BWP of the terminal device.

In this embodiment, the first access network device sends the first indication information to the second access network device. The first indication information indicates the information about the current active BWP of the terminal device on the first access network device. The second access network device determines, based on the first indication information, the appropriate information about the first-time active BWP and/or the appropriate BWP configuration information of the terminal device on the second access network device, to reduce service interruption caused by switching of the active BWP, and/or reduce service interruption caused by changing of the BWP configuration and changing of the active BWP.

Figure 3:
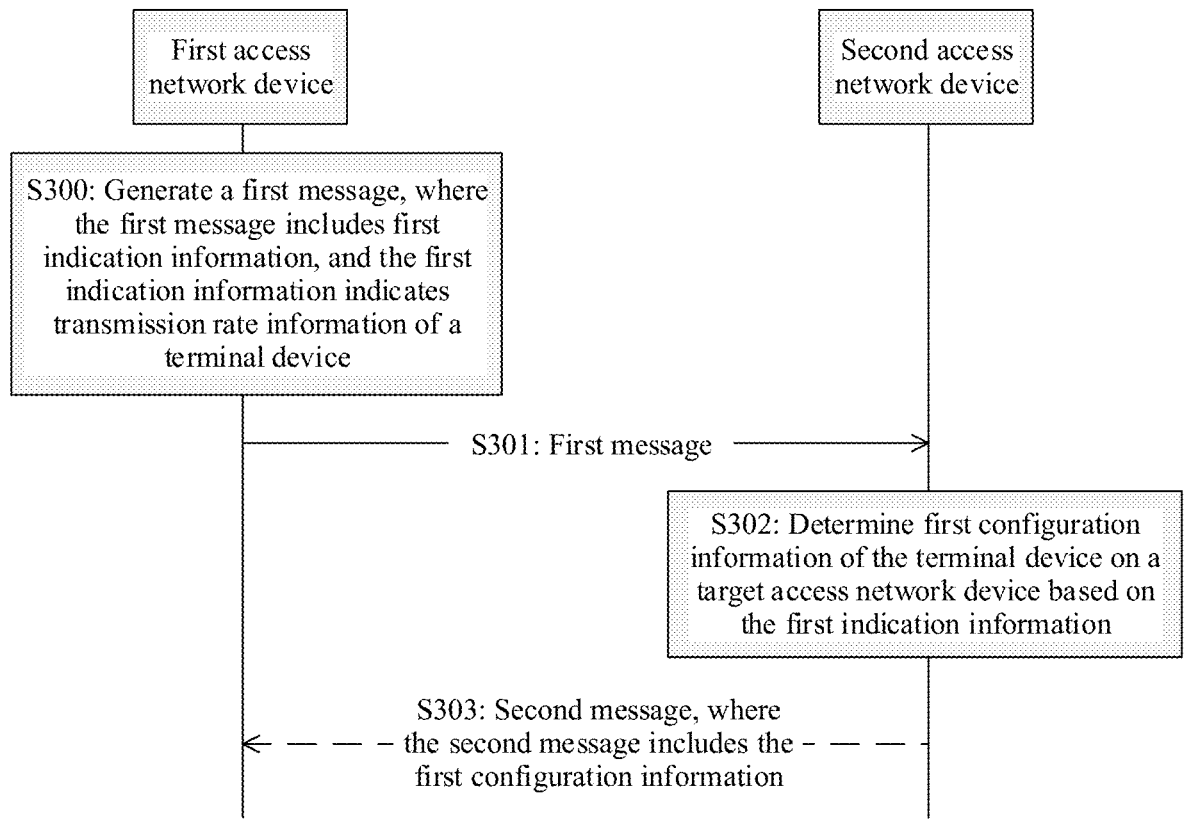
FIG. 3 is a flowchart of an example of a communication method according to an embodiment of this application.

Another embodiment of this application provides a communication method. FIG. 3 is a flowchart of the method. In the following descriptions, an example in which the method is applied to the communication system shown in FIG. 1 is used. In addition, the method may be performed by two communication apparatuses. For example, the two communication apparatuses are a first access network device and a second access network device. The first access network device may be a base station or a communication apparatus (for example, a chip system) that can support the base station in implementing a function needed in the method, or certainly may be another communication apparatus. The second access network device may be a base station or a communication apparatus (for example, a chip system) that can support the base station in implementing a function needed in the method, or certainly may be another communication apparatus. In addition, embodiments of the first access network device and the second access network device are not limited. For example, the two access network devices may be implemented in a same form. For example, the two access network devices are implemented in a form of a device. Alternatively, the two access network devices may be implemented in different forms. For example, the first access network device is implemented in a form of a device, and the second access network device is implemented in a form of a chip system.

For ease of description, in the following descriptions, an example in which the method is performed by the first access network device and the second access network device is used. In some embodiments, the first access network device may be a source access network device of the terminal device in a handover process or an RRC re-establishment process, and the second access network device may be a target access network device of the terminal device in the handover process or the RRC re-establishment process.

S300: The first access network device generates a first message.

The first message may include first indication information. S300 is similar to S200, and a difference lies in content in the first indication information. In this embodiment, the first indication information indicates transmission rate information of the terminal device on the first access network device. It may be understood that for names of first messages in various scenarios, further refer to related descriptions in S200. Details are not described herein again.

For example, the transmission rate information of the terminal device on the first access network device may be a transmitted data volume in a period (a fixed length) of time before execution of operation S300, or may be an average transmitted data volume in unit time, for example, a transmitted data volume per second or a service volume per second, before execution of operation S300.

The transmission rate information may include a transmission rate value, for example, 1.2 MB per second. The transmission rate information may also include transmission rate level information, for example, one of four levels: an ultra-high rate, a high rate, a medium rate, and a low rate. How to define these levels may be specified in a protocol, or these levels may be defined by the first access network device. The transmission rate information may also include transmission rate range information, for example, one of 0 to 200 KB per second, 200 KB to 2 MB per second, 2 MB to 10 MB per second, 10 MB to 50 MB per second, and at least 50 MB per second.

It may be understood that the transmission rate information of the terminal device on the first access network device may include downlink transmission rate information of the terminal device on the first access network device, or uplink transmission rate information of the terminal device on the first access network device, or the downlink transmission rate information and the uplink transmission rate information of the terminal device on the first access network device.

S301: The first access network device sends the first message to the second access network device.

Correspondingly, the second access network device receives the first message. For a name and content of the first message, refer to related descriptions in S300. Details are not described herein again.

S302: The second access network device determines first configuration information of the terminal device on the second access network device based on the first indication information.

The second access network device may determine, based on the first indication information, the first configuration information used by the terminal device on the second access network device after the terminal device is handed over to the second access network device. For example, the second access network device may obtain the transmission rate information of the terminal device on the first access network device based on the first indication information, and then may determine the matched first configuration information based on the transmission rate information. In some embodiments, in this embodiment of this application, "matched" may include that values are the same or similar, or may include that levels or ranges are the same or similar.

This is not limited in this embodiment of this application. "Similar" may be that an absolute value of a difference between the two is within a range (for example, less than or equal to a threshold). If there are no same or similar ones, "matched" may include a nearest value, level, or range.

In some embodiments, the first configuration information may include information about a first-time active BWP of the terminal device on the second access network device, and the information about the first-time active BWP may include an identifier of the first-time active BWP. A bandwidth of the first-time active BWP matches the transmission rate information. It may be understood that if the second access network device determines, based on the first indication information, the information about the first-time active BWP of the terminal device on the second access network device, BWP configuration information of the terminal device on the second access network device may be determined based on the first indication information, or may be determined in a conventional manner. Regardless of a manner in which the BWP configuration information of the terminal device on the second access network device is determined, the second access network device sends the BWP configuration information to the terminal device. In this case, the terminal device may determine configuration information of the first-time active BWP based on the received information about the first-time active BWP and the BWP configuration information, to perform data transmission based on the configuration information of the first-time active BWP.

For example, the second access network device may learn, based on the transmission rate information of the terminal device on the first access network device, that the terminal device also has a same or similar data transmission requirement on the second access network device. The second access network device may configure information about a first-time active BWP that matches the transmission rate information of the terminal device on the first access network device or a data transmission requirement of the terminal device. For example, if the transmission rate information of the terminal device on the first access network device indicates a rate level of "ultra-high rate", the second access network device may select, or determine, from a plurality of configured BWPs, a BWP with a maximum bandwidth that matches the "ultra-high rate" as the first-time active BWP, to meet the data transmission requirement. If the transmission rate information of the terminal device on the first access network device indicates a rate level of "low rate", a BWP with a minimum bandwidth that matches the "low rate" may be selected, or determined as the first-time active BWP from the plurality of configured BWPs, to meet a power saving requirement of the terminal device. For another example, if the transmission rate information of the terminal device on the first access network device indicates a rate value of "40 MB per second", the second access network device may select, or determine, from the plurality of configured BWPs, a BWP with a large bandwidth that matches the rate of "40 MB per second" as the first-time active BWP. If the transmission rate information of the terminal device on the first access network device indicates a rate value of "20 KB per second", the second access network device may select, or determine, from the plurality of configured BWPs, a BWP with a small bandwidth that matches the rate of "20 KB per second" as the first-time active BWP. For another example, if the transmission rate information of the terminal device on the first access network device indicates a rate range of "10 MB to 50 MB per second", the second access network device may select, or determine, from the plurality of configured BWPs, a BWP with a large bandwidth that matches the rate range of "10 MB to 50 MB per second" as the first-time active BWP. If the transmission rate information of the terminal device on the first access network device indicates a rate range of "0 to 200 KB per second", the second access network device may select, or determine, from the plurality of configured BWPs, a BWP with a small bandwidth that matches the rate range of "0 to 200 KB per second" as the first-time active BWP.

If there is no first indication information, the following case may appear: If a bandwidth of the first-time active BWP selected by the second access network device is excessively small, the active BWP needs to be changed to a BWP with a larger bandwidth again to meet the data transmission requirement. If the bandwidth of the first-time active BWP selected by the second access network device is excessively large, the active BWP needs to be changed to a BWP with a smaller bandwidth again to meet the power saving requirement of the terminal. Therefore, according to the method in some embodiments, an action that the terminal device needs to change the active BWP after the terminal device is handed over to the second access network device can be avoided or reduced, to further reduce caused service interruption.

In some embodiments, the first configuration information may be BWP configuration information. It may be understood that when the second access network device determines the BWP configuration information of the terminal device on the second access network device based on the first indication information, the information about the first-time active BWP of the terminal device on the second access network device may be determined based on the first indication information, or may be determined in a conventional manner. Regardless of a manner in which the information about the first-time active BWP of the terminal device on the second access network device is determined, the second access network device sends the information about the first-time active BWP to the terminal device. In this case, the terminal device may determine the configuration information of the first-time active BWP based on the received information about the first-time active BWP and the BWP configuration information, to perform data transmission based on the configuration information of the first-time active BWP.

For example, based on the transmission rate information of the terminal device on the first access network device, it may be learned that the terminal device also has the same or similar data transmission requirement on the second access network device, so that the second access network device may configure, based on the same or similar data transmission requirement, the appropriate BWP configuration information that matches the transmission rate information. For example, if the transmission rate information of the terminal device on the first access network device indicates the ultra-high rate, a matched BWP with a high bandwidth, for example, a configuration in Table 3, may be configured.

TABLE 3

| BWP identifier | Bandwidth |
|---|---|
| 1 | 20 MHz |
| 2 | 50 MHz |
| 3 | 100 MHz |

If the transmission rate information of the terminal device on the first access network device indicates the low rate, a matched BWP with a low bandwidth, for example, a configuration in Table 4, may be configured.

TABLE 4

| BWP identifier | Bandwidth |
|---|---|
| 1 | 5 MHz |
| 2 | 10 MHz |
| 3 | 30 MHz |

According to the method in some embodiments, an action that the terminal device needs to change a BWP configuration after the terminal device is handed over to the second access network device can be avoided or reduced, to further reduce caused service interruption.

It should be noted that, with reference to some embodiments, the first configuration information may include not only the information about the first-time active BWP, but also the BWP configuration information. In some embodiments, the second access network device determines the BWP configuration information based on the first indication information, and also determines the information about the first-time active BWP based on the first indication information. For example, the transmission rate information on the first access network device indicates the ultra-high rate, the BWP configuration in Table 3 is determined, and the first-time active BWP is determined as a BWP 3 with a highest bandwidth in three configured BWPs in Table 3. For another example, the transmission rate information on the first access network device indicates the low rate, the BWP configuration in Table 4 is determined, and the first-time active BWP is determined as a BWP 1 with a lowest bandwidth in three configured BWPs in Table 4. In this way, service interruption caused by switching of the active BWP is reduced, and service interruption caused by changing of the BWP configuration and changing of the active BWP is reduced.

The transmission rate information received by the second access network device from the first access network device may include the uplink transmission rate information and/or the downlink transmission rate information. Correspondingly, the information about the first-time active BWP determined by the second access network device based on the transmission rate information received from the first access network device may include information about a first-time active uplink BWP, for example, an identifier of the first-time active uplink BWP firstActiveUplinkBWP-Id, and/or information about a first-time active downlink BWP, for example, an identifier of the first-time active downlink BWP firstActiveDownlinkBWP-Id. Similarly, the BWP configuration information determined by the second access network device based on the transmission rate information received from the first access network device may include uplink BWP configuration information and/or downlink BWP configuration information.

For example, uplink and downlink transmission requirements may be inconsistent. For example, if the terminal device is downloading a file, a downlink transmission requirement is large, but an uplink transmission requirement is small. Therefore, the information about the first-time active uplink BWP and/or the uplink BWP configuration information on the second access network device may be determined based on the uplink transmission rate information on the first access network device, and the information about the first-time active downlink BWP and/or the downlink BWP configuration information on the second access network device may be determined based on the downlink transmission rate information on the first access network device.

In an RRC re-establishment scenario, the second access network device sends an RRC reconfiguration message to the terminal device. The RRC reconfiguration message includes the first configuration information. After receiving the message, the terminal device uses the first configuration information, for example, uses the first-time active BWP as the active BWP of the terminal device. In a handover scenario, the following operation S303 may be performed.

S303: The second access network device sends a second message to the first access network device.

Correspondingly, the first access network device receives the second message. The second message includes the first configuration information. It may be understood that, for a sending procedure or scenario of the second message, further refer to related descriptions in S203. Details are not described herein again.

In this embodiment, the first access network device sends the first indication information to the second access network device. The first indication information indicates the transmission rate information of the terminal device on the first access network device. The second access network device determines, based on the first indication information, the appropriate information about the first-time active BWP and/or the appropriate BWP configuration information of the terminal device on the second access network device, to reduce service interruption caused by switching of the active BWP, and/or reduce service interruption caused by changing of the BWP configuration and changing of the active BWP.

It should be noted that, in the foregoing embodiments, the first access network device sends the information about the current active BWP of the terminal device on the first access network device or the transmission rate information of the terminal device on the first access network device to the second access network device. When both the two pieces of information exist, if only one of the two pieces of information can be sent, the first access network device may preferentially send one of the two pieces of information. The priority may be specified in a protocol, or may be determined by the first access network device, or may be indicated by the second access network device, for example, indicated in a third message.

Still another embodiment of this application provides a communication method. In the communication method, a first access network device transmits both information about a current active BWP of a terminal device on the first access network device and transmission rate information of the terminal device on the first access network device to a second access network device. In some embodiments, first indication information includes both the information about the current active BWP of the terminal device on the first access network device and the transmission rate information of the terminal device on the first access network device. The second access network device may determine appropriate first configuration information by comprehensively considering the two pieces of information. For example, when the transmission rate information indicates a high rate, but a bandwidth of the current active BWP in a same direction is small, the second access network device may determine the first configuration information in the direction based on the transmission rate information. When the transmission rate information indicates a low rate, but the bandwidth of the current active BWP in the same direction is large, the second access network device may determine the first configuration information in the direction based on the information about the current active BWP. For another example, the second access network device preferentially determines the first configuration information based on the transmission rate information. In some embodiments, when the first access network device transmits both the transmission rate information and the information about the current active BWP to the second access network device, the second access network device determines the first configuration information based on the transmission rate information, and ignores the information about the current active BWP. When the first access network device does not transmit the transmission rate information to the second access network device, the second access network device determines the first configuration information based on the information about the current active BWP. It may be understood that, for content such as a procedure of the communication method in this embodiment and the information about the current active BWP and the transmission rate information, refer to related descriptions in the foregoing two embodiments. Details are not described herein again.

With reference to the accompanying drawings, the following describes apparatuses configured to implement the foregoing methods in embodiments of this application. Therefore, all the foregoing content may be used in the following embodiments. Repeated content is not described again.

Figure 4:
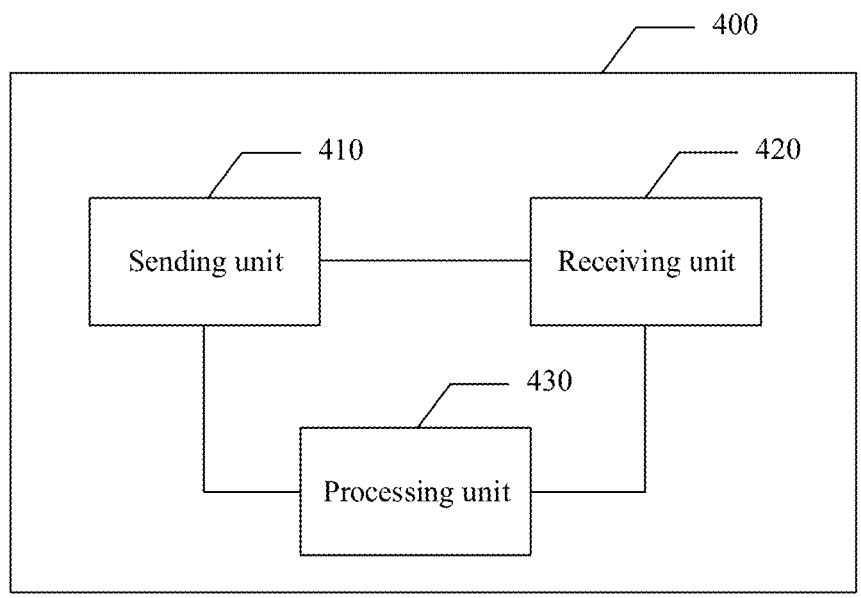
FIG. 4 is a schematic diagram of a structure of a communication apparatus according to an embodiment of this application.

FIG. 4 is a schematic block diagram of a communication apparatus 400 according to an embodiment of this application. The communication apparatus 400 may correspondingly implement functions or operations implemented by the first access network device or the second access network device in the foregoing method embodiments.

In some embodiments, the communication apparatus may include one or more of a sending unit 410, a receiving unit 420, and a processing unit 430. In some embodiments, the communication apparatus may further include a storage unit. The storage unit may be configured to store instructions (code or a program) and/or data. The sending unit 410, the receiving unit 420, and the processing unit 430 may be coupled to the storage unit. For example, the processing unit 430 may read the instructions (the code or the program) and/or the data in the storage unit, to implement a corresponding method. The foregoing units may be disposed independently, or may be partially or completely integrated.

In some embodiments, the communication apparatus 400 can correspondingly implement behavior and functions of the first access network device in the foregoing method embodiments. For example, the communication apparatus 400 may be the first access network device, or may be a component (for example, a chip or a circuit) used in the first access network device. The sending unit 410 and the receiving unit 420 may be configured to perform all receiving or sending operations performed by the first access network device in the foregoing method embodiments, for example, S201 in the embodiment shown in FIG. 2 or S301 in the embodiment shown in FIG. 3, and/or another process used to support the technology described in this specification. The processing unit 430 is configured to perform all operations other than the sending and receiving operations performed by the first access network device in the foregoing method embodiments, and/or is configured to support another process of the technology described in this specification.

In some embodiments, the processing unit 430 is configured to generate a first message. The first message includes first indication information. The first indication information indicates information about a current active BWP and/or transmission rate information of the terminal device on the first access network device. The information about the current active BWP may include an identifier of the current active BWP and/or a bandwidth of the current active BWP. The transmission rate information may include a transmission rate value, transmission rate level information, or transmission rate range information. Because there are two transmission directions: an uplink transmission direction and a downlink transmission direction, the information about the current active BWP may include information about a current active downlink BWP and/or information about a current active uplink BWP. The information about the current active downlink BWP helps the second access network device determine a downlink parameter in appropriate first configuration information. In this way, service interruption caused by switching of an active downlink BWP is reduced, and/or service interruption caused by changing of a downlink BWP configuration and changing of the active downlink BWP is reduced. The information about the current active uplink BWP helps the second access network device determine an uplink parameter in the appropriate first configuration information. In this way, service interruption caused by switching of an active uplink BWP is reduced, and/or service interruption caused by changing of an uplink BWP configuration and changing of the active uplink BWP is reduced.

The sending unit 410 is configured to send the first message to the second access network device.

In some embodiments, the receiving unit 420 is configured to receive a second message from the second access network device. The second message includes the first configuration information. The first configuration information may include information about a first-time active BWP and/or BWP configuration information of the terminal device on the second access network device. The information about the first-time active BWP may include an identifier of the first-time active BWP. Because there are two transmission directions: the uplink transmission direction and the downlink transmission direction, the information about the first-time active BWP may include information about a first-time active downlink BWP and/or information about a first-time active uplink BWP, and the BWP configuration information may include downlink BWP configuration information and/or uplink BWP configuration information. In some embodiments, the sending unit 410 sends the first configuration information to the terminal device.

In some embodiments, in an RRC re-establishment scenario, the receiving unit 420 is configured to receive a retrieve UE context request message from the terminal device before sending the first message to the second access network device. The retrieve UE context request message is used to request to obtain context information of the terminal device. The first message may be a retrieve UE context response message.

It should be understood that, the processing unit 430 in this embodiment of this application may be implemented by at least one processor or a processor-related circuit component. The sending unit 410 and the receiving unit 420 may be implemented by a transceiver, a transceiver-related circuit component, or a communication interface.

In some embodiments, the communication apparatus 400 can correspondingly implement behavior and functions of the second access network device in the foregoing method embodiments. For example, the communication apparatus 400 may be the second access network device, or may be a component (for example, a chip or a circuit) used in the second access network device. The sending unit 410 and the receiving unit 420 may be configured to perform all receiving or sending operations performed by the second access network device in the foregoing method embodiments, for example, S201 in the embodiment shown in FIG. 2 or S301 in the embodiment shown in FIG. 3, and/or another process used to support the technology described in this specification. The processing unit 430 is configured to perform all operations other than the sending and receiving operations performed by the second access network device in the foregoing method embodiments, and/or is configured to support another process of the technology described in this specification.

In some embodiments, the receiving unit 420 is configured to receive the first message from the first access network device. The first message includes the first indication information. The first indication information indicates the information about the current active BWP and/or the transmission rate information of the terminal device on the first access network device. The information about the current active BWP may include the identifier of the current active BWP and/or the bandwidth of the current active BWP. The transmission rate information may include the transmission rate value, the transmission rate level information, or the transmission rate range information. Because there are two transmission directions: the uplink transmission direction and the downlink transmission direction, the information about the current active BWP may include the information about the current active downlink BWP and/or the information about the current active uplink BWP. The information about the current active downlink BWP helps the second access network device determine the downlink parameter in the appropriate first configuration information. In this way, service interruption caused by switching of the active downlink BWP is reduced, and/or service interruption caused by changing of the downlink BWP configuration and changing of the active downlink BWP is reduced. The information about the current active uplink BWP helps the second access network device determine the uplink parameter in the appropriate first configuration information. In this way, service interruption caused by switching of the active uplink BWP is reduced, and/or service interruption caused by changing of the uplink BWP configuration and changing of the active uplink BWP is reduced.

In some embodiments, the sending unit 410 is configured to send the second message to the first access network device. The second message includes the first configuration information. The first configuration information may include the information about the first-time active BWP and/or the BWP configuration information of the terminal device on the second access network device. The information about the first-time active BWP may include the identifier of the first-time active BWP. Because there are two transmission directions: the uplink transmission direction and the downlink transmission direction, the information about the first-time active BWP may include the information about the first-time active downlink BWP and/or the information about the first-time active uplink BWP, and the BWP configuration information may include the downlink BWP configuration information and/or the uplink BWP configuration information.

In some embodiments, in the RRC re-establishment scenario, before the receiving unit 420 receives the first message from the first access network device, the sending unit 410 is configured to send a third message to the first access network device. The third message may be the retrieve UE context request message of an XnAP protocol, and is used to request to obtain the context information of the terminal device. The first message may be the retrieve UE context response message. After the receiving unit 420 receives the first message from the first access network device, the sending unit 410 may send an RRC reconfiguration message to the terminal device. The RRC reconfiguration message includes the first configuration information. After receiving the message, the terminal device uses the first configuration information, for example, uses the first-time active BWP as the active BWP of the terminal device.

The processing unit 430 is configured to determine the first configuration information of the terminal device on the second access network device based on the first indication information. The first configuration information may include the information about the first-time active BWP and/or the BWP configuration information of the terminal device on the second access network device. The information about the first-time active BWP may include the identifier of the first-time active BWP. Because there are two transmission directions: the uplink transmission direction and the downlink transmission direction, the information about the first-time active BWP may include the information about the first-time active downlink BWP and/or the information about the first-time active uplink BWP, and the BWP configuration information may include the downlink BWP configuration information and/or the uplink BWP configuration information.

It should be understood that the processing unit 430 in this embodiment of this application may be implemented by a processor or a processor-related circuit component. The sending unit 410 and the receiving unit 420 may be implemented by a transceiver or a transceiver-related circuit component.

The storage unit in the foregoing embodiment may be implemented by a memory.

Figure 5:
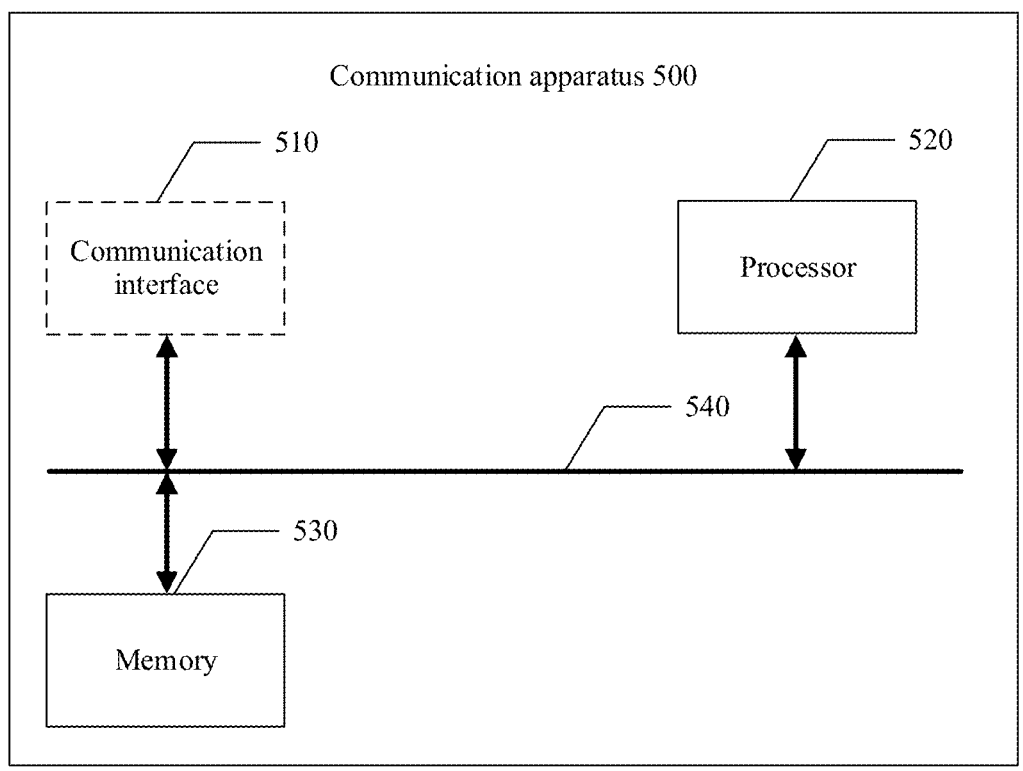
FIG. 5 is a schematic diagram of another structure of a communication apparatus according to an embodiment of this application.

FIG. 5 shows a communication apparatus 500 according to an embodiment of this application. The communication apparatus 500 may be an access network device, and can implement a function of the first access network device or the second access network device in the methods provided in embodiments of this application. Alternatively, the communication apparatus 500 may be a terminal device, and can implement a function of the terminal device in the methods provided in embodiments of this application. Alternatively, the communication apparatus 500 may be an apparatus that can support the first access network device or the second access network device in implementing a corresponding function in the methods provided in embodiments of this application, or an apparatus that can support the terminal device in implementing a corresponding function in the methods provided in embodiments of this application. The communication apparatus 500 may be a chip system. In this embodiment of this application, the chip system may include a chip, or may include a chip and another discrete component.

The communication apparatus 500 includes at least one processor 520, configured to implement or support the communication apparatus 500 in implementing a function of the first access network device, the second access network device, or the terminal device in the methods provided in embodiments of this application. For details, refer to detailed descriptions in the method example. Details are not described herein again.

The communication apparatus 500 may further include at least one memory 530, configured to store program instructions and/or data. The memory 530 is coupled to the processor 520. The coupling in embodiments of this application may be an indirect coupling or a communication connection between apparatuses, units, or modules in an electrical form, a mechanical form, or another form, and is used for information exchange between the apparatuses, the units, or the modules. The processor 520 may operate in collaboration with the memory 530. The processor 520 may execute the program instructions and/or the data stored in the memory 530, so that the communication apparatus 500 implements a corresponding method. In some embodiments, at least one of the at least one memory may be included in the processor.

The communication apparatus 500 may further include a communication interface 510, configured to support communication with another device through a transmission medium, so that an apparatus in the communication apparatus 500 can communicate with the another device. For example, when the communication apparatus is the terminal device, the another device is the first access network device or the second access network device. Alternatively, when the communication apparatus is the first access network device or the second access network device, the another device is the terminal device. The processor 520 may send and receive data using the communication interface 510. The communication interface 510 may be a transceiver. For example, the sending unit 410 and the receiving unit 420 form the communication interface 510.

This embodiment of this application does not limit a connection medium between the communication interface 510, the processor 520, and the memory 530. For example, in this embodiment of this application, in FIG. 5, the memory 530, the processor 520, and the communication interface 510 are connected through a bus 540, and the bus is represented using a bold line in FIG. 5. A connection manner between other components is merely an example for description, and imposes no limitation. The bus may be classified into an address bus, a data bus, a control bus, and the like. For ease of representation, only one bold line is used to represent the bus in FIG. 5, but this does not mean that there is only one bus or only one type of bus.

In this embodiment of this application, the processor 520 may be a general-purpose processor, a digital signal processor, an application-specific integrated circuit, a field programmable gate array or another programmable logic device, a discrete gate or transistor logic device, or a discrete hardware component, and may implement or perform the methods, operations, and logical block diagrams disclosed in embodiments of this application. The general-purpose processor may be a microprocessor or any conventional processor or the like. The operations of the methods disclosed with reference to embodiments of this application may be directly performed by a hardware processor, or may be performed by using a combination of hardware in the processor and a software module.

In this embodiment of this application, the memory 530 may be a non-volatile memory such as a hard disk drive (HDD) or a solid-state drive (SSD), or may be a volatile memory such as a random access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

It should be noted that the communication apparatus in the foregoing embodiment may be a terminal device, a circuit, or a chip used in the terminal device, or may be another combined component or component that has functions of the terminal device. When the communication apparatus is the terminal device, the transceiver unit may be the transceiver, and may include an antenna, a radio frequency circuit, and the like. The processing module may be the processor, for example, a central processing unit (CPU). When the communication apparatus is the component that has functions of the terminal device, the transceiver unit may be the radio frequency unit, and the processing module may be the processor. When the communication apparatus is the chip system, the transceiver unit may be an input/output interface of the chip system, and the processing module may be a processor of the chip system.

Figure 6:
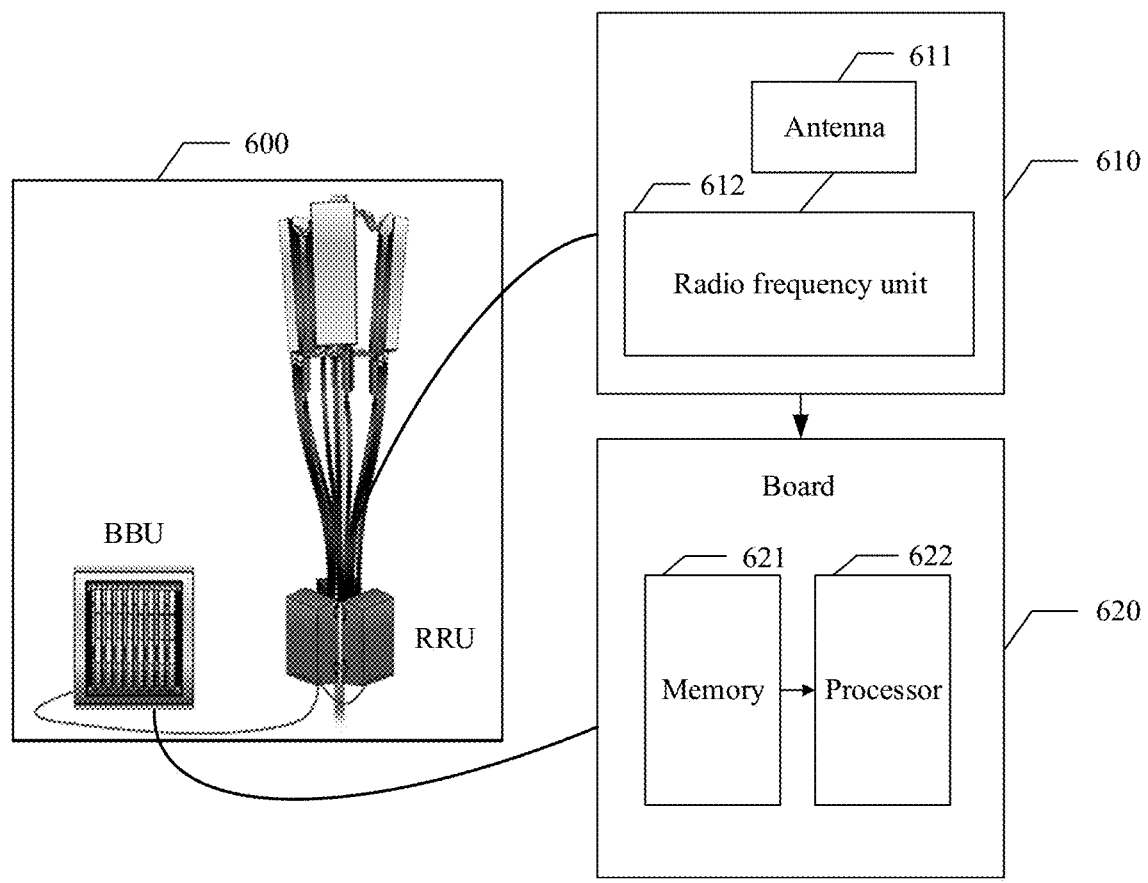
FIG. 6 is a schematic diagram of another structure of a communication apparatus according to an embodiment of this application.

FIG. 6 is a simplified schematic diagram of a structure of a communication apparatus. For ease of understanding and illustration, in FIG. 6, an access network device is used as an example of the communication apparatus. The access network device may be applied to the system shown in FIG. 1, and may be the network device in FIG. 1, to perform a function of the access network device in the foregoing method embodiments. The access network device 600 may include one or more radio frequency units such as a remote radio unit (RRU) 610 and one or more baseband units (BBUs) (which may also be referred to as a digital unit, or DU) 620. The RRU 610 may be referred to as a communication module, and corresponds to the sending unit 410 and the receiving unit 420 in FIG. 4. In some embodiments, the communication module may also be referred to as a transceiver machine, a transceiver circuit, a transceiver, or the like, and the communication module may include at least one antenna 611 and a radio frequency unit 612. The RRU 610 is mainly configured to send and receive a radio frequency signal, and perform conversion between the radio frequency signal and a baseband signal. For example, the RRU 610 is configured to send indication information to a terminal device. The BBU 620 is mainly configured to perform baseband processing, control the access network device, and the like. The RRU 610 and the BBU 620 may be physically disposed together, or may be physically separated, that is, in a distributed access network device.

The BBU 620 is a control center of the access network device, or may be referred to as a processing module. The BBU 620 may correspond to the processing unit 430 in FIG. 4, and is mainly configured to implement a baseband processing function, such as channel coding, multiplexing, modulation, or spreading. For example, the BBU (the processing module) may be configured to control the access network device to perform an operation procedure related to the access network device in the foregoing method embodiments, for example, generate the indication information.

In an example, the BBU 620 may include one or more boards, and a plurality of boards may jointly support a radio access network (for example, an LTE network) of a single access standard, or may separately support radio access networks (for example, an LTE network, a 5G network, or another network) of different access standards. The BBU 620 further includes a memory 621 and a processor 622. The memory 621 is configured to store instructions and data. The processor 622 is configured to control the access network device to perform an action, for example, is configured to control the access network device to perform an operation procedure related to the access network device in the foregoing method embodiments. The memory 621 and the processor 622 may serve the one or more boards. In some embodiments, a memory and a processor may be disposed on each board. Alternatively, the plurality of boards may share a same memory and a same processor. In addition, a circuit may further be disposed on each board.

An embodiment of this application further provides a communication apparatus. The communication apparatus may be a terminal device, or may be a circuit. The communication apparatus may be configured to perform an action performed by the terminal device in the foregoing method embodiments.

Figure 7:
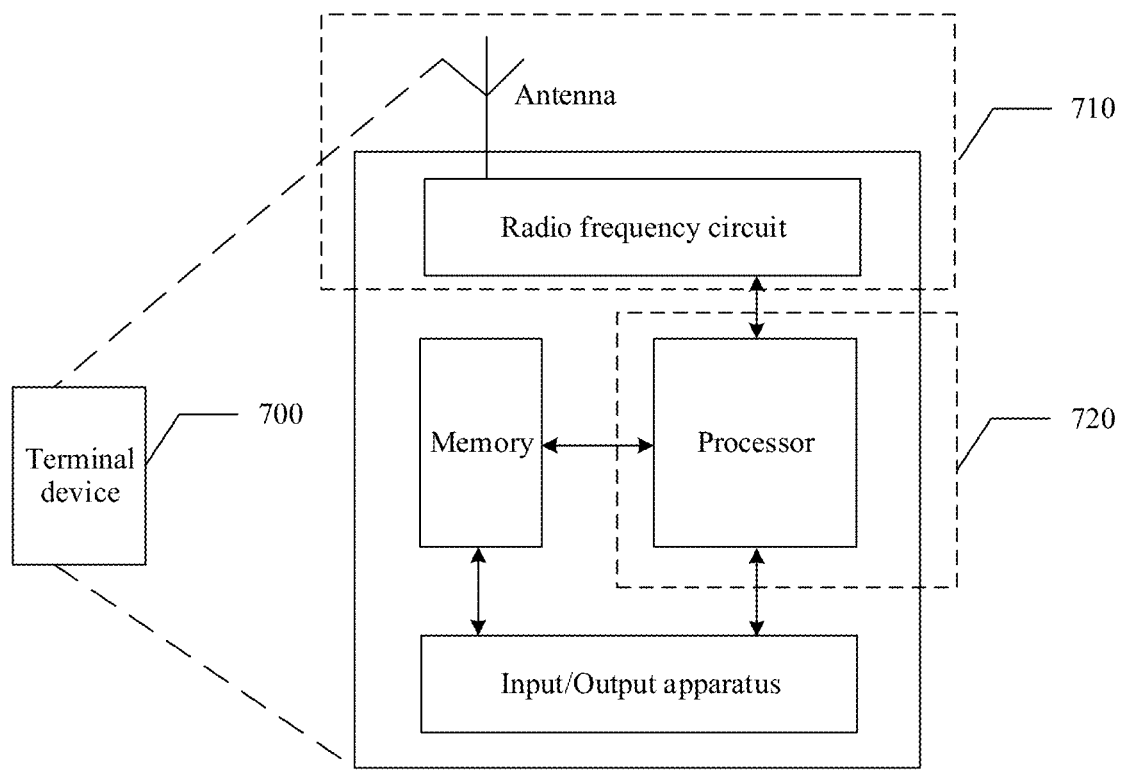
FIG. 7 is a schematic diagram of another structure of a communication apparatus according to an embodiment of this application.

FIG. 7 is a simplified schematic diagram of a structure of a terminal device. For ease of understanding and illustration, an example in which the terminal device is a mobile phone is used in FIG. 7. As shown in FIG. 7, the terminal device includes a processor, a memory, a radio frequency circuit, an antenna, and an input/output apparatus. The processor is mainly configured to process a communication protocol and communication data, control an on-board unit, execute a software program, and process data of the software program. The memory is mainly configured to store the software program and data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to receive data input by a user and output data to the user. It should be noted that some types of devices may have no input/output apparatus.

When data needs to be sent, after performing baseband processing on the to-be-sent data, the processor outputs a baseband signal to the radio frequency circuit. The radio frequency circuit performs radio frequency processing on the baseband signal and then sends a radio frequency signal to the outside in a form of an electromagnetic wave through the antenna. When data is sent to the device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 7 shows only one memory and one processor. In an actual device product, there may be one or more processors and one or more memories. The memory may also be referred to as a storage medium, a storage device, or the like. The memory may be disposed independent of the processor, or may be integrated with the processor. This is not limited in embodiments of this application.

In embodiments of this application, the antenna and the radio frequency circuit that have receiving and sending functions may be considered as a transceiver unit of the apparatus, and the processor having a processing function may be considered as a processing unit of the apparatus. As shown in FIG. 7, the apparatus includes a transceiver unit 710 and a processing unit 720. The transceiver unit 710 may also be referred to as a transceiver, a transceiver machine, a transceiver apparatus, or the like. The processing unit 720 may also be referred to as a processor, a processing board, a processing module, a processing apparatus, or the like. In some embodiments, a component that is in the transceiver unit 710 and that is configured to implement a receiving function may be considered as a receiving unit, and a component that is in the transceiver unit 710 and that is configured to implement a sending function may be considered as a sending unit. That is, the transceiver unit 710 includes the receiving unit and the sending unit. The transceiver unit 710 sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 710 is configured to perform a sending operation and a receiving operation on a terminal device side in the foregoing method embodiments, and the processing unit 720 is configured to perform an operation other than the receiving operation and the sending operation of the terminal device in the foregoing method embodiments.

For example, in some embodiments, the transceiver unit 710 may be configured to perform S201 in the embodiment shown in FIG. 2, and/or support another process of the technology described in this specification.

In some embodiments, the transceiver unit 710 may be configured to perform S301 in the embodiment shown in FIG. 3, and/or support another process of the technology described in this specification.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 8:
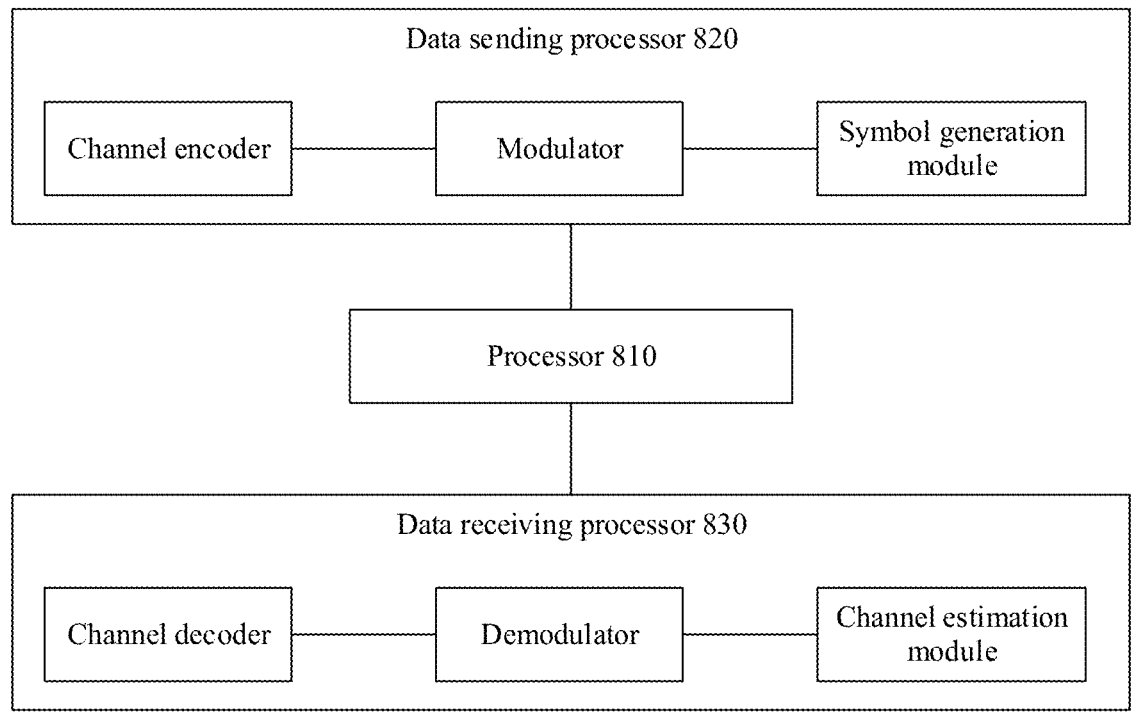
FIG. 8 is a schematic diagram of another structure of a communication apparatus according to an embodiment of this application.

In this embodiment, refer to an apparatus shown in FIG. 8. In an example, the apparatus may implement functions similar to functions of the processing unit 430 in FIG. 4. In FIG. 8, the apparatus includes a processor 810, a data sending processor 820, and a data receiving processor 830. The processing unit 430 in the foregoing embodiment may be the processor 810 in FIG. 8, and implements a corresponding function. The processing unit 430 in the foregoing embodiment may be the data sending processor 820 and/or the data receiving processor 830 in FIG. 8. Although FIG. 8 shows a channel encoder and a channel decoder, it may be understood that these modules are merely examples, and do not constitute a limitation on this embodiment.

Figure 9:
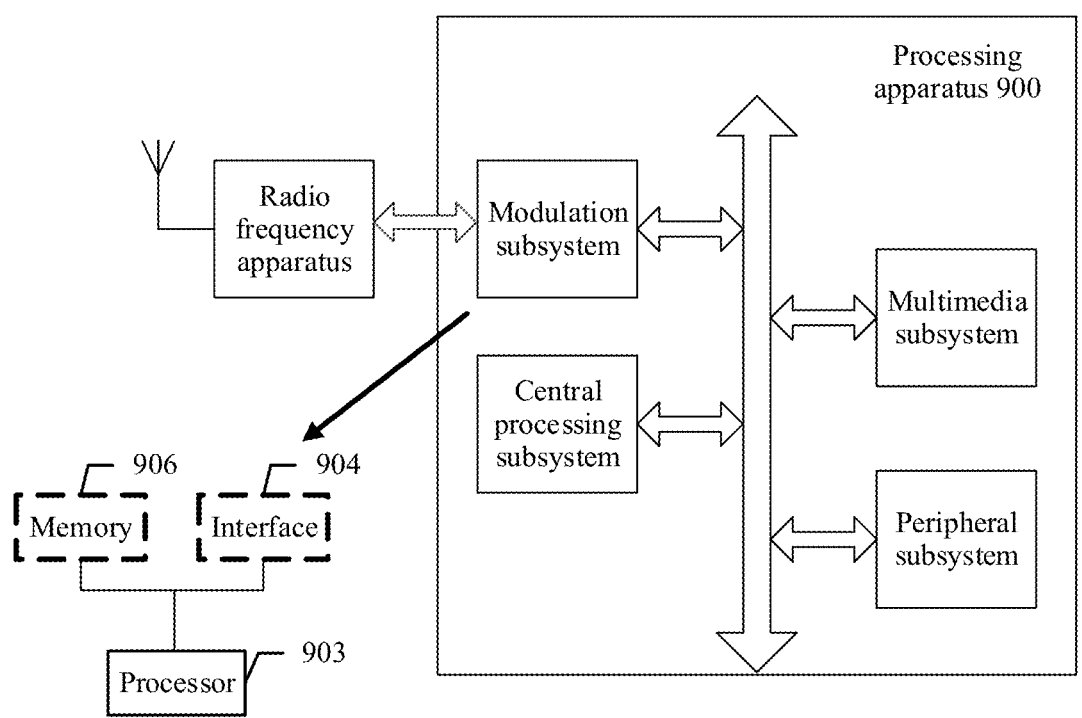
FIG. 9 is a schematic diagram of another structure of a communication apparatus according to an embodiment of this application.

FIG. 9 shows another form of this embodiment. A communication apparatus 900 includes modules such as a modulation subsystem, a central processing subsystem, and a peripheral subsystem. The communication apparatus in this embodiment may be used as the modulation subsystem. In some embodiments, the modulation subsystem may include a processor 903 and an interface 904. The processor 903 completes a function of the processing unit 430, and the interface 904 completes functions of the sending unit 410 and the receiving unit 420. In another variation, the modulation subsystem includes a memory 906, a processor 903, and a program that is stored in the memory 906 and that can be run on the processor. When executing the program, the processor 903 implements the method of the terminal device in the foregoing method embodiments. It should be noted that the memory 906 may be non-volatile or volatile. The memory 906 may be located in the modulation subsystem, or may be located in the processing apparatus 900, provided that the memory 906 can be connected to the processor 903.

An embodiment of this application further provides a communication system. In some embodiments, the communication system may include a first access network device and a second access network device, or may include more first access network devices and a plurality of second access network devices. In some embodiments, the communication system may further include at least one terminal device. For example, the communication system includes the first access network device and the second access network device that are configured to implement related functions in FIG. 2 or FIG. 3. Alternatively, the communication system includes the first access network device and the second access network device that are configured to implement related functions in FIG. 4. Alternatively, the communication system includes the first access network device and the second access network device that are configured to implement related functions in FIG. 5 or FIG. 6. Alternatively, the communication system includes the first access network device and the second access network device that are configured to implement related functions in the embodiments of at least two of FIG. 2, FIG. 3, FIG. 4, FIG. 5, or FIG. 6.

An embodiment of this application further provides a computer-readable storage medium, including instructions. When the instructions are run on a computer, the computer is enabled to perform a method performed by the first access network device or the second access network device in FIG. 2, FIG. 3, FIG. 4, FIG. 5, or FIG. 6.

An embodiment of this application further provides a computer program product, including instructions. When the computer program product runs on a computer, the computer is enabled to perform a method performed by the first access network device or the second access network device in FIG. 2, FIG. 3, FIG. 4, FIG. 5, or FIG. 6.

An embodiment of this application provides a chip system. The chip system includes a processor, may further include a memory, and is configured to implement functions of the first access network device and the second access network device in the foregoing methods; or configured to implement functions of the first access network device, the second access network device, and the terminal device in the foregoing methods. The chip system may include a chip, or may include a chip and another discrete component.

It should be understood that the terms "system" and "network" may be used interchangeably in embodiments of this application. "At least one" means one or more, and "a plurality of" means two or more. A term "and/or" describes an association relationship between associated objects and represents that three relationships may exist. For example, A and/or B may represent the following cases: Only A exists, both A and B exist, and only B exists, where A and B may be singular or plural. The character "/" generally represents an "or" relationship between the associated objects. "At least one of the following items (pieces)" or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first message and a second message are merely intended to distinguish between different messages, but do not indicate that the two messages are different in priorities, a sending sequence, or importance.

It should be understood that the processor mentioned in embodiments of this application may be a CPU, or may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It may be understood that the memory mentioned in embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification is intended to include but is not limited to these memories and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

A part or all of the foregoing embodiments may be implemented through software, hardware, firmware, or any combination thereof. When software is used to implement the embodiments, a part or all of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid State Disk (SSD)), or the like.

The foregoing descriptions are merely embodiments of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A communication method, wherein the method comprises:
   receiving, by a second access network device, a first message from a first access network device, wherein the first message comprises first indication information, and the first indication information indicates information about a current active bandwidth part (BWP) of a terminal device on the first access network device and/orand transmission rate information of the terminal device on the first access network device, and wherein the information about the current active BWP comprises information about a current active downlink BWP and information about a current active uplink BWP; and determining, by the second access network device, first configuration information of the terminal device on the second access network device based on the first indication information.

2. The method according to claim 1, wherein
   the transmission rate information comprises at least one of uplink transmission rate information or downlink transmission rate information.

3. The method according to claim 1, further comprising:
   sending, by the second access network device, a second message to the first access network device, wherein the second message comprises the first configuration information, wherein the first message is a handover request message, and the second message is a handover request acknowledgment message; or the first message is a handover preparation information message, and the second message is a handover command message.

4. The method according to claim 1, wherein before the receiving, by the second access network device, the first message from the first access network device, the method further comprises:
   sending, by the second access network device, a third message to the first access network device, wherein the third message is used to request to obtain context information of the terminal device, wherein the third message is a retrieve UE context request message, and the first message is a retrieve UE context response message.

5. The method according to claim 1, wherein
   the first configuration information comprises at least one of information about a first-time active BWP or BWP configuration information.

6. The method according to claim 5, wherein the determining, by the second access network device, first configuration information of the terminal device on the second access network device based on the first indication information comprises:
   determining, by the second access network device, the information about the first-time active BWP or the BWP configuration information that matches bandwidth information of the current active BWP or the transmission rate information.

7. A communication method, wherein the method comprises:
   generating, by a first access network device, a first message, wherein the first message comprises first indication information, and the first indication information indicates information about a current active bandwidth part (BWP) of a terminal device on the first access network device and transmission rate information of the terminal device on the first access network device, and wherein the information about the current active BWP comprises information about a current active downlink BWP and information about a current active uplink BWP; and
   sending, by the first access network device, the first message to a second access network device.

8. The method according to claim 7, wherein
   the transmission rate information comprises at least one of uplink transmission rate information or downlink transmission rate information.

9. The method according to claim 7, further comprising:
   receiving, by the first access network device, a second message from the second access network device, wherein the second message comprises first configuration information of the terminal device on the second access network device, and the first configuration information is determined based on the first indication information; and sending, by the first access network device, the first configuration information to the terminal device, wherein the first message is a handover request message, and the second message is a handover request acknowledgment message; or the first message is a handover preparation information message, and the second message is a handover command message.

10. The method according to claim 9, wherein
the first configuration information comprises at least one of information about a first-time active BWP or BWP configuration information.

11. The method according to claim 7, wherein before the generating, by the first access network device, the first message, the method further comprises:

receiving, by the first access network device, a third message from the second access network device, wherein the third message is used to request to obtain context information of the terminal device.

12. The method according to claim 11, wherein
the third message is a retrieve UE context request message, and the first message is a retrieve UE context response message.

13. A communication apparatus, comprising:
a memory; and
a processor, that is operatively coupled to the memory, to:

receive a first message from a first access network device, wherein the first message comprises first indication information, and the first indication information indicates information about a current active bandwidth part (BWP) of a terminal device on the first access network device and transmission rate information of the terminal device on the first access network device, and wherein the information about the current active BWP comprises information about a current active downlink BWP and information about a current active uplink BWP; and determine first configuration information of the terminal device on a second access network device based on the first indication information.

14. The communication apparatus according to claim 13, wherein
the transmission rate information comprises at least one of uplink transmission rate information or downlink transmission rate information.

15. The communication apparatus according to claim 13, wherein the processor is further to:
send a second message to the first access network device, wherein the second message comprises the first configuration information.

16. The communication apparatus according to claim 13, wherein the processor is further to:
send a third message to the first access network device before receiving the first message from the first access network device, wherein the third message is used to request to obtain context information of the terminal device.

17. The apparatus according to claim 16, wherein
the third message is a retrieve UE context request message, and the first message is a retrieve UE context response message.

* * * * *

UNITED STATES PATENT AND TRADEMARK OFFICE
CERTIFICATE OF CORRECTION

PATENT NO. : 12,369,086 B2
APPLICATION NO. : 18/170731
DATED : July 22, 2025
INVENTOR(S) : Zhaoqing Yang, Haoxiang Zhu and Bingzhao Li Page 1 of 1

It is certified that error appears in the above-identified patent and that said Letters Patent is hereby corrected as shown below:

In the Claims

In Column 37, Claim 1, Line 62, delete "and/orand" and insert --and--.

Signed and Sealed this
Fourth Day of November, 2025

John A. Squires
*Director of the United States Patent and Trademark Office*